United States Patent
Sankaranarayanan et al.

(10) Patent No.: US 8,825,506 B2
(45) Date of Patent: Sep. 2, 2014

(54) GENERATION AND OPTIMIZATION OF DATA SHARING AMONG MULTIPLE DATA SOURCES AND CONSUMERS

(71) Applicant: NEC Laboratories America, Inc., Princeton, NJ (US)

(72) Inventors: Jagan Sankaranarayanan, Santa Clara, CA (US); Vahit Hakan Hacigumus, San Jose, CA (US); Mohamed Sarwat, Minneapolis, MN (US); Haopeng Zhang, Seattle, WA (US)

(73) Assignee: NEC Laboratories America, Inc., Princeton, NJ (US)

( * ) Notice: Subject to any disclaimer, the term of this patent is extended or adjusted under 35 U.S.C. 154(b) by 38 days.

(21) Appl. No.: 13/666,438

(22) Filed: Nov. 1, 2012

(65) Prior Publication Data
US 2013/0110574 A1     May 2, 2013

Related U.S. Application Data

(60) Provisional application No. 61/554,157, filed on Nov. 1, 2011.

(51) Int. Cl.
G06Q 10/00 (2012.01)
G06F 15/173 (2006.01)
G06Q 10/10 (2012.01)
G06Q 10/06 (2012.01)
H04L 12/24 (2006.01)

(52) U.S. Cl.
CPC .............. *G06Q 10/06* (2013.01); *G06Q 10/101* (2013.01); *G06Q 10/0631* (2013.01); *H04L 41/5003* (2013.01)

USPC ......... 705/7.12; 705/7.25; 709/213; 709/226; 709/238; 711/147

(58) Field of Classification Search
USPC ................................ 705/7.12, 7.25; 709/226
See application file for complete search history.

(56) References Cited

U.S. PATENT DOCUMENTS

| | | | |
|---|---|---|---|
| 6,418,510 B1 * | 7/2002 | Lamberts ...................... | 711/113 |
| 2002/0169644 A1 * | 11/2002 | Greene ........................... | 705/7 |
| 2004/0054748 A1 * | 3/2004 | Ackaouy et al. .............. | 709/214 |
| 2011/0213712 A1 * | 9/2011 | Hadar et al. ................... | 705/80 |
| 2012/0284383 A1 * | 11/2012 | Dudek et al. .................. | 709/223 |
| 2012/0290348 A1 * | 11/2012 | Hackett et al. ............... | 705/7.13 |

OTHER PUBLICATIONS

Zhang et al., "Secure Cooperative Cache Based Data Access in Ad Hoc Networks," NSF International Workshop on Theoretical and Algorithmic Aspects of Wireless Ad Hoc, Sensor, and Peer-to-Peer Networks, pp. 11-16, Jun. 2004.*

(Continued)

*Primary Examiner* — Peter Choi
*Assistant Examiner* — Timothy Padot
(74) *Attorney, Agent, or Firm* — Joseph Kolodka

(57) ABSTRACT

Systems and methods for data sharing include generating at least one sharing plan with a cheapest cost and/or a shortest execution time for one or more sharing arrangements. Admissibility of the one or more sharing arrangements is determined such that a critical time path of the at least one sharing plan does not exceed a staleness level and a cost of the at least one sharing plan does not exceed a capacity. Sharing plans of admissible sharing arrangements are executed while maintaining the staleness level.

10 Claims, 3 Drawing Sheets

(56) References Cited

OTHER PUBLICATIONS

Lamehamedi, Houda. Decentralized data management framework for data grids. Rensselaer Polytechnic Institute, ProQuest, UMI Dissertations Publishing, 2005. 3207487 (Abstract).*

Agrawal, S., et al. "Automated Selection of Materialized Views and Indexes for SQL Databases" Proceedings of the 26th International Conference on Very Large Data Bases. 2000. pp. 496-505.

Agrawal, D., et al. "Efficient View Maintenance at Data Warehouses" Proceedings of the 1997 ACM SIGMOD International Conference on Management of Data. May 1997. pp. 417-427.

Aulbach, S., et al. "Extensibility and Data Sharing in Evolving Multi-Tenant Databases" IEEE 27th International Conference on Data Engineering (ICDE). Apr. 2011. pp. 99-110.

Balazinska, M., et al. "Data Markets in the Cloud: An Opportunity for the Database Community" Proceedings of the VLDB Endowment, vol. 4, No. 12. Sep. 2011. (4 pages).

Blakeley, J., et al. "Efficiently Updating Materialized Views" Proceedings of the 1986 ACM SIGMOD International Conference on Management of Data, SIGMOD '86. May 1986. pp. 61-71.

Chaudhuri, S. "An Overview of Query Optimization in Relational Systems" Proceedings of the Seventeenth ACM SIGACT-SIGMOD-SIGART Symposium on Principles of Database Systems. Jun. 1998. (11 pages).

Chekuri, C., et al. "A PTAS for the Multiple Knapsack Problem" Proceedings of the 11th Annual ACM-SIAM Symposium on Discrete Algorithms. Jan. 2000. pp. 1-19.

Garofalakis, M., et al. "Parallel Query Scheduling and Optimization With Time- and Space-Shared Resources" Proceedings of 23rd International Conference on Very Large Data Bases. Aug. 1997. pp. 296-305.

Geambasu, R., et al. "Cloudviews: Communal Data Sharing in Public Clouds" Proceedings of the 2009 Conference on Hot Topics in Cloud Computing, No. 14. Jun. 2009. pp. 1-5.

Green, T.J, et al., "Orchestra: Facilitating Collaborative Data Sharing" Proceedings of the 2007 ACM SIGMOD International Conference on the Management of Data. Jun. 2007. (5 Pages).

Kossmann, M., et al. "Cache Investment: Integrating Query Optimization and Distributed Data Placement" ACM Transactions on Database Systems, vol. 25, No. 4. Dec. 2000. pp. 517-558.

Krishnamurthy, S., et al. "The Case for Precision Sharing" Proceedings of the Thirtieth International Conference on Very Large Data Bases. Sep. 2004. (12 Pages).

Labrinidis, A., et al. "Reduction of Materialized View Staleness Using Online Updates" Technical Report CS-TR-3878, University of Maryland. Feb. 1998. pp. 1-21.

Lohman, G., et al. "Query Processing in R*" Query Processing in Database Systems. 1985. (36 Pages).

Mistry, H., et al. "Materialized View Selection and Maintenance Using Multiquery Optimization" SIGMOD 2001 Electronic Proceedings. 2001. (12 Pages).

Ross, K., et al. "Materialized View Maintenance and Integrity Constraint Checking: Trading Space for Time" Proceedings of the 1996 ACM SIGMOD International Conference on Management of Data. Jun. 1996. (12 Pages).

Salem, K., et al. "How to Roll a Join: Asynchronous Incremental View Maintenance" Proceedings of the 2000 ACM SIGMOD International Conference on Management of Data. May 2000. (12 Pages).

Zhuge, Y., et al. "The Strobe Algorithms for Multi-Source Warehouse Consistency" Proceedings of the Fourth International Conference on Parallel and Distributed Information Systems. Dec. 1996. (12 Pages).

Zhuge, Y., et al. "View Maintenance in a Warehousing Environment" Proceedings of the 1995 ACM SIGMOD International Conference on Management of Data. May 1995. pp. 1-36.

* cited by examiner

US 8,825,506 B2

GENERATION AND OPTIMIZATION OF DATA SHARING AMONG MULTIPLE DATA SOURCES AND CONSUMERS

RELATED APPLICATION INFORMATION

This application claims priority to provisional application Ser. No. 61/554,157 filed on Nov. 1, 2011, incorporated herein by reference in its entirety.

This application is related to commonly assigned U.S. application Ser. No. 13/666,544, entitled "FINDING OPTIMUM COMBINED PLANS AMONG MULTIPLE SHARING ARRANGEMENTS AND MULTIPLE DATA SOURCES AND CONSUMERS," filed concurrently herewith, which is incorporated by reference herein in its entirety.

BACKGROUND

1. Technical Field

The present invention relates to data sharing and, more specifically, to the generation and optimization of data sharing among multiple data sources and consumers.

2. Description of the Related Art

The ability to share data among a number of different applications is a desired feature for businesses for many reasons, such as increased organizational efficiency, targeted advertising, rich user experience though data enrichment, etc. The different applications may be hosted on the cloud, where shared data and the cloud service provider provide computing resources to those applications to provide seamless data sharing. There may be a large number of sharing agreements among the data sources, who provide the data, and the consumers, who pay for the data. Each of these agreements may be described as a sharing plan. In this setting, executing a sharing plan incurs a cost due to the use of infrastructure resources, which is paid by the provider. Also, a consumer may require a certain level of data freshness, which is described as a service level agreement (SLA). As such, providers seek to find sharing plans that minimize cost while satisfying consumer SLAs.

SUMMARY

A method for data sharing includes generating at least one sharing plan with a cheapest cost and/or a shortest execution time for one or more sharing arrangements. Admissibility of the one or more sharing arrangements is determined such that a critical time path of the at least one sharing plan does not exceed a staleness level and a cost of the at least one sharing plan does not exceed a capacity. Sharing plans of admissible sharing arrangements are executed while maintaining the staleness level.

A system for data sharing includes a generation module configured to generate at least one sharing plan with a cheapest cost and/or a shortest execution time for one or more sharing arrangements. The generation module is further configured to determine admissibility of the one or more sharing arrangements such that a critical time path of the at least one sharing plan does not exceed a staleness level and a cost of the at least one sharing plan does not exceed a capacity. A sharing executor module is configured to execute sharing plans of admissible sharing arrangements while maintaining the staleness level.

A method for data sharing includes merging sharing plans of admissible sharing arrangements to provide a merged sharing plan. A set of all possible plumbings is determined for the merged sharing plan. A plumbing with a maximum profit is iteratively applied to the merged sharing plan for each plumbing of the set such that a staleness level is maintained to provide an optimized sharing plan.

A system for data sharing includes a merging module configured to merge sharing plans of admissible sharing arrangements to provide a merged sharing plan. The merging module is further configured to determine a set of all possible plumbings for the merged sharing plan. The merging module is further configured to iteratively apply a plumbing with a maximum profit to the merged sharing plan for each plumbing of the set such that a staleness level is maintained to provide an optimized sharing plan.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1A:
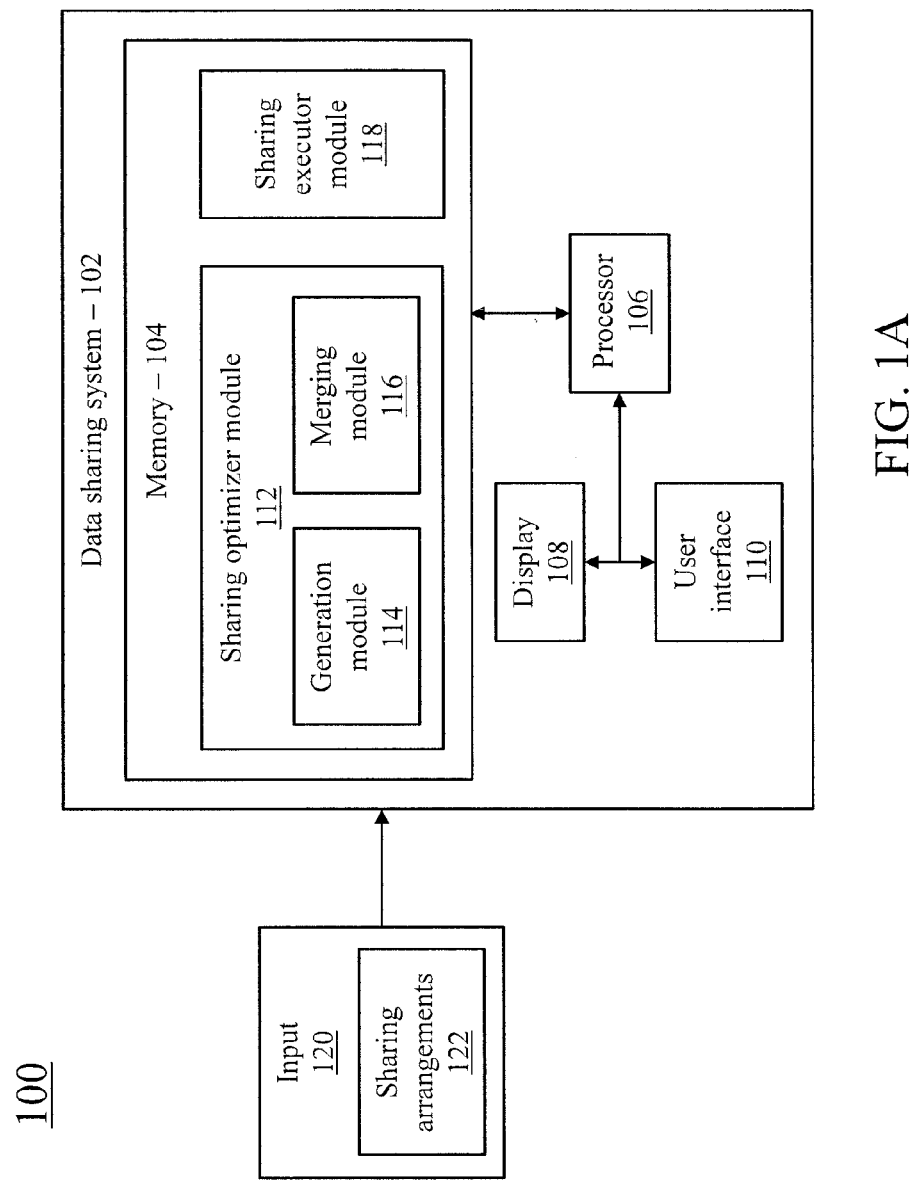
FIG. 1A is a block/flow diagram showing a system/method of data sharing among multiple data sources and consumers in accordance with one embodiment.

In accordance with the present principles, systems and methods for the generation and optimization of data sharing among multiple data sources and consumers are provided. For each sharing arrangement in a set of sharing arrangements, a sharing plan with a cheapest dollar cost is generated. It is then determined whether that particular sharing arrangement is admissible. The sharing arrangement is admissible where a critical time path of the sharing plan with the cheapest dollar cost does not exceed a staleness level (e.g., service level agreement) and a cost of the sharing plan with the cheapest dollar cost does not exceed a capacity.

If the sharing arrangement for the sharing plan with the cheapest dollar cost is not admissible, a sharing plan with a smallest time path is generated. It is determined whether the sharing arrangement for the sharing plan with the smallest time path is admissible. If it is not admissible, the sharing arrangement is rejected. Sharing plans for admitted sharing arrangements may be provided to a sharing executor. Advantageously, multiple sharing plans may be executed simultaneously.

In one embodiment, the sharing plans for admitted sharing arrangements may be optimized before being provided to the sharing executor. The sharing plans are first merged to create a merged sharing plan. A set of all possible plumbings that may be performed on the merged sharing plan is determined. The plumbing in the set with the maximum profit is iteratively applied to the merged sharing plan for each plumbing in the set. The optimized sharing plan may be provided to the sharing executor.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1A, a block/flow diagram showing a system for data sharing among multiple data sources and consumers 100 is illustratively depicted in accordance with one embodiment. The data sharing system 102 preferably includes one or more processors 106 and memory 104 for storing programs and applications. It should be understood that the functions and components of the system 102 may be integrated into one or more systems.

The system 102 may include a display 108 for viewing. The display 108 may also permit a user to interact with the system 102 and its components and functions. This may be further facilitated by a user interface 110, which may include a keyboard, mouse, joystick, or any other peripheral or control to permit user interaction with the system 102.

Data sharing system 102 receives input 120, which includes a set of sharing arrangements 122. Memory 104 includes sharing optimizer module 112, which includes generation module 114. For each sharing arrangement of the set of sharing arrangements 122, the generation module 114 is configured to generate several different sharing plans that implement the sharing arrangement. The goal of the sharing optimizer module 112 is to produce a sharing plan that is admissible, has a low cost to setup, and can be maintained by the system at the desired level of staleness. Sharing plans are preferably expressed in terms of vertices and edges forming a directed acyclic graph (DAG).

For each sharing arrangement in a set of sharing arrangements 122, the generation module 114 is configured to generate a sharing plan with the cheapest dollar cost. The cost of a sharing plan, expressed in dollars per second, is computed as the amount of machine, network, and disk capacity consumed per second to keep the sharing arrangement at the desired staleness level. The cost may be expressed as the sum of a static cost, which represents an initial investment to set up derived relations, and a dynamic cost, which represents the expense incurred to move tuples through the edges of a sharing plan. The static cost of a sharing plan is converted to dollars per second by dividing each cost component (e.g., machine, network, disk, etc.) by a recoup constant (e.g. per hour, per month, per gigabyte, etc.). The dynamic cost is computed in terms of the number of tuples stored, moved across the network and the machine capacity consumed in generating and moving the tuples per second through the edges in the sharing plan.

The generation module 114 then determines whether the sharing arrangement for the sharing plan with the cheapest dollar cost is admissible. The admissibility forms a hard constraint in that the sharing generation module 114 should not admit a sharing arrangement that cannot be handled by the system 102. Thus, sharing plans that have a critical time path greater than the staleness cannot be maintained by the system 102 at the desired staleness level and are therefore not admissible. The critical time path represents the longest path in terms of time taken to push tuples from source vertices of the sharing plan to the destination vertex. Similarly, if a sharing plan exceeds the capacity of a machine by virtue of placing too many vertices and edge on it, it is also not admissible.

If the sharing arrangement for the sharing plan with the cheapest dollar cost is admissible, the generation module 114 moves on to the next sharing arrangement in the set of sharing arrangements 122. If the sharing plan with the cheapest dollar cost is not admissible, the generation module 114 generates a sharing plan with the smallest time path for that sharing arrangement. In some embodiments, a user may choose whether to generate a sharing plan with a cheapest dollar cost or a sharing plan with the smallest time path. The smallest time path is determined based on the critical time path.

If the sharing arrangement for the sharing plan with the smallest time path is admissible, then the generation module 114 moves on to the next sharing arrangement in the set of sharing arrangements 122. If the sharing arrangement for the sharing plan with the smallest time path is not admissible, the sharing arrangement is rejected and the generation module 114 moves on to the next sharing arrangement of the set 122. Rejected sharing arrangements may involve further negotiation with the consumer. The generation module 114 thus provides sharing plans for admitted sharing arrangements.

In one embodiment, sharing optimizer module 112 may also include merging module 116 configured to merge the set of sharing plans after admittance by taking advantage of the commonalities between sharing arrangements. Merging module 116 merges the sharing plans to create a single sharing plan D. A set V of all possible plumbings that can be performed in D is determined. A plumbing generally refers to the action of providing an alternate yet identical input to an operator using a mechanism that is different from the one currently providing input to it. More specifically, a plumbing determines commonalities between two or more sharing plans and merges the two or more sharing plans, discarding all operators from one or more of the sharing plans prior to the commonality.

The plumbing operation in V that provides the maximum profit (i.e., maximum benefit-cost) while not violating the staleness SLA of any of the sharing arrangements is performed on the sharing plan D. When no more plumbing operations in the set V can be applied to D, the sharing plan is forwarded to the sharing executor module 118. Advantageously, the merging module 116 iteratively optimizes the commonalities to find a global optimum cost with combined sharing plans.

Memory 104 also includes sharing executor module 118. For the set S of sharing arrangements and the sharing plan D produced by the merging module 116, the sharing executor module 118 executes D in the most efficient manner to maximize profit (by reducing operating cost) for the provider, while maintaining the desired staleness level. The present principles provide low cost of delivering data sharing services for the service providers and SLA guarantees for customers.

Figure 2A:
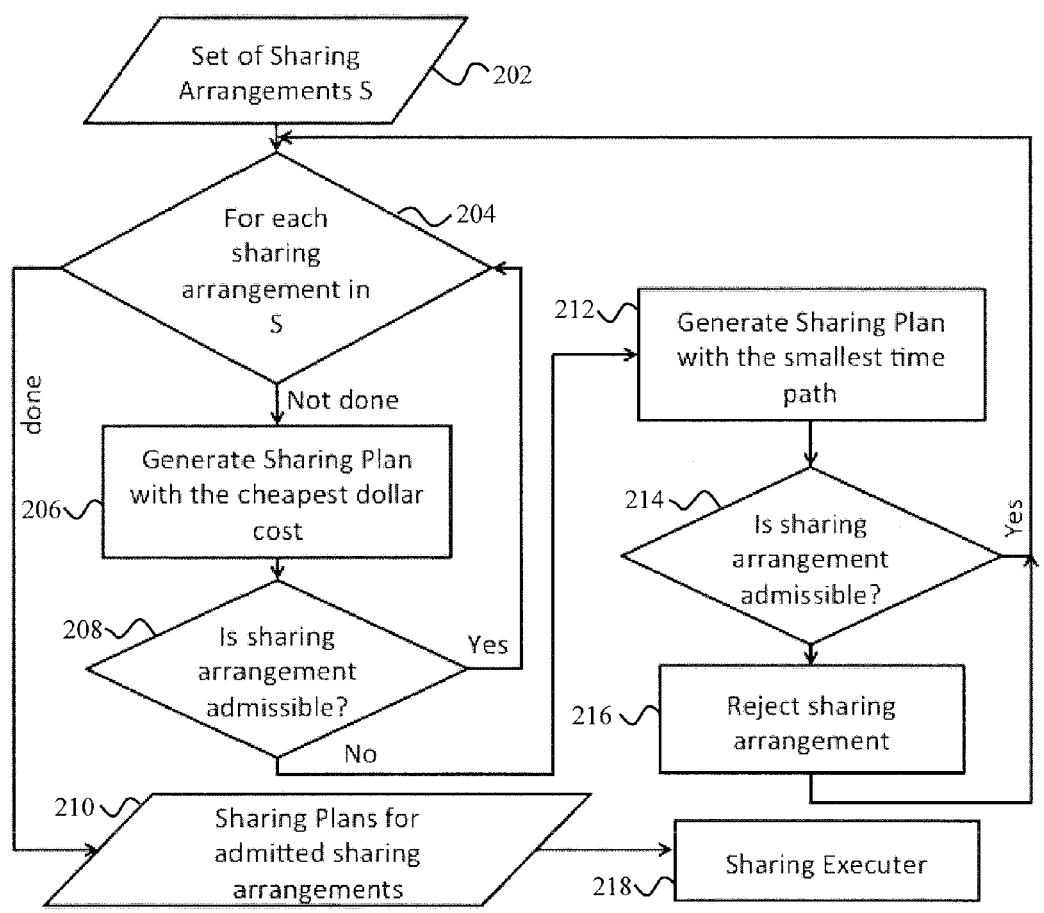
FIG. 2A is a block/flow diagram showing a method for generation and optimization of data sharing among multiple data sources and consumers in accordance with one embodiment.

Referring now to FIG. 2A, a block/flow diagram showing a method for generation and optimization of data sharing among multiple data sources and consumers 200 in accordance with one embodiment. In block 202, a set of sharing arrangements S is provided. In block 204, for each sharing arrangement in the set S, the sharing plan with the cheapest dollar cost is generated in block 206. The cost may include the amount of machine, network, and disk capacity consumed per second to maintain the sharing arrangement at the desired staleness level.

In block 208, it is determined whether the sharing arrangement for the sharing plan with the cheapest dollar cost is admissible. A sharing arrangement is admissible if, e.g., the cost of its sharing plan does not exceed the capacity of the machine (e.g., cost is not ∞) and the critical time of the sharing plan does not exceed the desired staleness level. The critical time represents the longest path in terms of time taken to push tuples from source vertices of the sharing plan to the destination vertex. Other admissibility constraints are also contemplated. If the sharing arrangement for the sharing plan with the cheapest dollar cost is admissible, the method moves on to the next sharing arrangement in S in block 202.

If the sharing arrangement for the sharing plan with the cheapest dollar cost is not admissible, in block 212, the sharing plan with the smallest time path is generated for the sharing arrangement. The smallest time path is preferably determined based on the critical time path. In block 124, it is determined whether the sharing arrangement for the sharing plan with the smallest time path is admissible. If the sharing arrangement for the sharing plan with the smallest time path is admissible, the method moves on to the next sharing arrangement in S in block 202. If the sharing arrangement for the sharing plan with the smallest time path is not admissible, in block 216, the sharing arrangement is rejected and the method moves on to the next sharing arrangement in S. In some embodiments, a user may choose whether to generate a sharing plan with the cheapest dollar cost or a sharing plan with the smallest time path.

Once sharing plans for each sharing arrangement in S has been generated, in block 210, the sharing plans for the admissible sharing arrangements are provided. In block 218, the sharing plans are forwarded to the sharing executor. Preferably, the sharing executor simultaneously executes the sharing plans. In other embodiment, the sharing plans for the admissible sharing arrangements in block 210 are combined prior to be sent to the sharing executor, as will be discussed with respect to FIG. 3A.

Figure 3A:
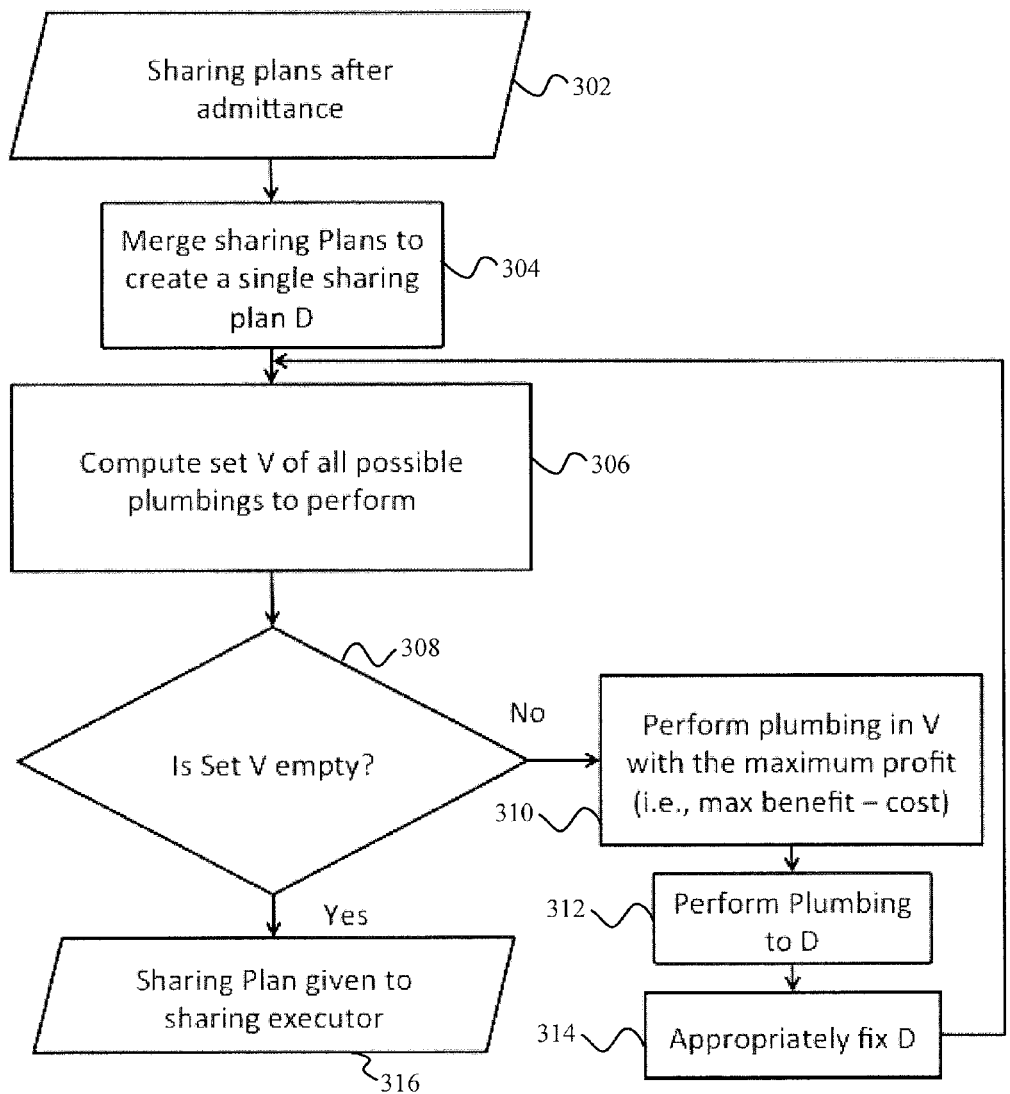
FIG. 3A is a block/flow diagram showing a method for determining optimum combined plans among multiple sharing arrangements in accordance with one embodiment.

Referring now to FIG. 3A, a block/flow diagram showing a method for determining optimum combined plans among multiple sharing arrangements 300 is illustratively depicted in accordance with one embodiment. In block 302, sharing plans for admissible sharing arrangements are provided. Sharing plans for admissible sharing arrangements may be generated as discussed with respect to FIG. 2A. Other methods of sharing plan generation are also contemplated. In block 304, the sharing plans for admissible sharing arrangements are merged to create a single sharing plan D. In block 306, a set V of all possible plumbings that can be performed in D is computed. Plumbings combine vertices belonging to different sharing arrangements so that rather than retaining two separate sets of vertices and edges, a merged set is provided. Plumbings may include, e.g., copy plumbing and join plumbing. Other types of plumbings are also contemplated.

In block 308, it is determined whether the set of possible plumbings V is empty. If the set V is not empty, in block 310, the plumbing in V with the maximum profit is performed (e.g., maximum benefit-cost). In block 312, the plumbing is performed in the merged sharing plan D. In block 314, D is appropriately fixed by merging the commonality and discarding operators of one or more sharing plans. The method then returns to block 306 until the set of all possible plumbings V is empty in block 308.

Once the set of all possible plumbings V is empty, the sharing plan is forwarded to the sharing executor in block 316. Advantageously, the present principles iteratively optimize the defined commonalities to find a global optimum cost with combined sharing plans.

Having described preferred embodiments of a system and method for generation and optimization of data sharing among multiple data sources and consumers (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Additional information is provided in Appendix A to the application. Having thus described aspects of the invention, with the details and particularity required by the patent laws, what is claimed and desired protected by Letters Patent is set forth in the appended claims.

Appendix A

ABSTRACT

A multitenant cloud database is a data rich ecosystem where tenants are data sources and consumers require data from different tenants. A framework for specifying sharing arrangements between tenants and consumers in a multitenant cloud database is proposed and implemented using materialized views. A sharing arrangement takes relational tables from different tenants as sources, a transformation which is expressed in terms of select, project and join (SPJ) operators and a Service Level Agreement (SLA) which specifies the desired level of staleness on the materialized view produced as a result of the sharing arrangement. The proposed system takes a set of sharing arrangements $S$ and first determines which of them are admissible into the system. Next, a reduction in the operating cost for the provider is achieved by appealing to the commonality between the various sharing arrangements, after which the system maintains all the sharing arrangements at the desired level of staleness. Experimental evaluation is performed by creating a rich sharing ecosystem around Twitter data, where the system maintains several sharing arrangements with very low violations, even under a high rate of updates (4B/week) far exceeding the actual Twitter rate (1B/week).

1. INTRODUCTION

Sharing is a natural action of an owner giving up a portion of something potentially of benefit to others. When it comes to sharing data, unlike tangible things, it has the unnatural quality in that it can be replicated with little or no cost to the *owner*, but at the same time can be immensely beneficial to the *consumer*. Sharing of relational data (i.e., relations in our case) between tenants within a multitenant cloud database is the main focus of this work. Our multitenant cloud database hosts a set of *tenants* who are data owners assigned to one or more machines. A set of *consumers* (also can be tenants in the system) who want data from multiple tenants also are present in our infrastructure. Another key player is the *provider* who runs the cloud infrastructure, facilitating sharing arrangements between the tenants and the consumers in the cloud. In a cloud infrastructure hosting multiple tenants, sharing of data between tenants and consumers is envisioned as being achieved by the three parties entering into *sharing arrangements* using a framework that we describe in this paper. Given that the tenants and consumers are hosted in a common infrastructure, traditional methods of sharing data (e.g., web services) add unnecessary layers of abstraction when the most efficient way of sharing in the cloud is to give direct access to each other's data, or make copies of each other's data. We motivate our sharing scenario from a mobile computing perspective, where sharing between mobile apps hosted in a cloud results in a rich experience to the mobile user. The tenants in this case are mobile apps that have hosted their backend databases in the cloud. Data sharing between the tenants can result in a *seamless* mobile experience for the user as can be seen from the following example.

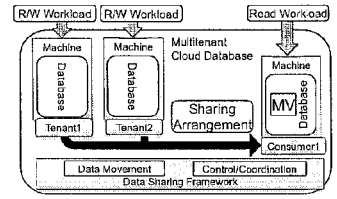

Figure 1: Sharing between tenants and a consumer is defined using a sharing arrangement EXAMPLE 1. *Suppose that three apps – Inbox2 (i.e., email), Plango (i.e., calendar) and Opentable (i.e., restaurant reservation) – are hosted in a multitenant cloud database as shown in Figure 1. Meeting appointments extracted by Inbox2 from user emails are shared with Plango. Users can choose which appointments to add to their calendar using a suitable user interface, after which Plango sends reminder alerts to the user. Appointments of users requiring dinner reservations are shared by Plango with Opentable, which uses it proactively to look for restaurant options. Mobile users get a seamless experience as the three apps now behave as a single entity.*

A *sharing arrangement* is defined in terms of tenants who have relations available for sharing and a single consumer who wants data drawn from single or multiple tenants with *staleness* guarantees. In this setting, a sharing arrangement is enabled by the creation of a *materialized view* (MV), which is maintained at a consistent snapshot such that it is no more than $x$ (say, 10) seconds behind the current state of the source relations. Even though we use MVs to enable sharing arrangements, it may be unrealistically expensive to create these MVs for cases where the source relations are large, or if the read to write ratio on the MVs is not high enough to justify the effort in maintaining them at the appropriate staleness level. Note that the determination of which views to (or not to) materialize is beyond the scope of this paper as we only look at the mechanics of enabling a large number of MVs in the cloud with SLA guarantees. In particular, we assume that the source relations are small and the destination relation has an active read workload that is large enough to justify the creation and use of MVs. Moreover, sharing using MVs has the benefit that it can be enabled with *minimal* unfavorable interaction with the tenant's queries, which is hard to ensure if the consumers are given direct access to the tenant's data by using SQL or via a web service.

Staleness of data is an important consideration from a mobile computing perspective as the utility of some user related information gets progressively less valuable with time. For instance, the location of a mobile user that is (say) 50 seconds stale may be of limited use to a navigation app, but may not be unsuitable for a restaurant recommendation app. We provide the tenants and consumers with tools so that they can identify what is available for sharing as well as come up with reasonable staleness requirements based on their application needs, after which the provider implements the sharing arrangement to the satisfaction of the tenants and the consumer.

Traditionally, a stumbling block to data sharing is overcoming data integration issues, which we circumvent in this paper by envisioning that our sharing happens in an *ecosystem* where there is a *global* schema to which individual tenant relations that are available for sharing are mapped. We are seeing such a trend with mobile apps where more and more apps are realizing the utility of aligning their *user schema* (i.e., user ids, name, location etc.) with publicly available social networking websites (e.g., Twitter, Facebook) as that gives them access to the rich connections between users. For instance, the three apps in Example 1, i.e., Inbox2, Plango and Opentable, all use Facebook ids to identify their users. This trend also is permeating into other domains, such as *four square* ids for places, *imdb* ids for movies, *isbn* for books, etc., which makes data integration, although still extremely relevant, more manageable. An ecosystem built around *Twitter* is used as the experimental setup in this paper. The following example shows instances of sharing arrangements between tenants and consumers where whole, fragments as well as combinations (i.e., relational joins) of relations are shared between tenants and consumers.

EXAMPLE 2. *Tenant* $T_1$ *(Inbox2) owns* Eml_Evnts: (Uid, Evnt_id, ⋯) *of events extracted from user's email. Tenant* $T_2$ *(Plango) owns* Usr_Accts: (Uid, ⋯) *of users subscribed to their service, such that the calender information of users are stored in* Usr_Evnts: (Uid, Evnt_id, Type, ⋯). *Similarly, tenant* $T_3$ *(Opentable) owns* Usr_Info: (Uid, ⋯) *of users that use their app. To recreate the scenario in Example 1, Plango requests that* Eml_Evnts ⋈ Usr_Accts *be maintained at a staleness SLA of* $\leq$ 20 *seconds. Appointments after approval from the users are added to* Usr_Evnts. *Opentable requires that* $\sigma_{Type="dinner"}$Usr_Evnts ⋈ Usr_Info *be maintained at a staleness SLA of* $\leq$ 45 *seconds. Another tenant* $T_4$ *(Foursq) owns* Geog_Ent (Ent_id, place, type, lat, lng, ⋯). *A consumer* $C_1$ *wants a copy of the relation to be maintained at a staleness SLA of* $\leq$ 20 *seconds. Another consumer* $C_2$ *wants a relation* SEATTLE_DAT *given by* $\pi_{\{Ent\_id, lat, lng\}}\sigma_{\{place="Seattle"\}}$ Geog_Ent, *maintained at a staleness of* $\leq$ 10 *seconds.*

A sharing arrangement $S_i$ in our system is defined in terms of a set of source relations SRC($S_i$) to which a SPJ transformation, denoted by QRY($S_i$), is applied to produce a destination relation DST($S_i$). The consumer requires that the destination relation always be maintained at a staleness no worse than that specified by the staleness SLA, denoted by SLA($S_i$). We look at the problem from a provider's perspective in the sense that we design a system that takes a set $S = \{S_1 \cdots S_m\}$ of $m$ sharing arrangements as input. Then it determines which of the sharings in $S$ are *admissible*, or in other words, can be satisfied by the system in terms of being able to maintain the SLA. Once a set of admissible sharing arrangements is known, we develop strategies to identify an inexpensive way of enabling these sharing arrangements for the provider.

The rest of the paper is organized as follows: Section 2 provides related work, whereas preliminary concepts are discussed in Section 3. Properties of a sharing plan implementing a sharing arrangement are developed in Section 4, whereas a sharing optimizer algorithm is explained in Section 5. Next, a sharing executor that maintains the sharing arrangements at the desired level of staleness in briefly discussed in Section 6. Finally, experimental results are provided in Section 7 and concluding remarks are drawn in Section 8.

2. RELATED WORK

Sharing using MVs adds interesting dimensions to a well studied problem domain. A MV maintenance process traditionally is broken into a *propagation* step, where updates to the MV are computed and an *apply* step, where updates are applied to the MV. First of all, the autonomy of the tenants means that *synchronous* propagation algorithms [5], where all sources are always at a consistent snapshot, are unsuitable for our purposes. Furthermore, to deal with the autonomy of the tenants, one has to resort to a compensation algorithm [18], where the propagation is computed on asynchronous source relations [1, 16, 19]. In particular, MVs over distributed asynchronous sources have been studied in the context of a single data warehouse [1, 19] to which all updates are sent. The key optimization studied in [1, 19] is in terms of reducing the number of queries needed to bring the MVs to a consistent state in the face of continuous updates on the source relations. [16] shows how $n$-way asynchronous propagation queries can be computed in small asynchronous steps, which are *rolled* together to bring the MVs to any consistent state between last refresh and present. Reducing the cost of maintenance plans of a set of materialized view $S$ is explored in [14], where *common subexpressions* [15] are created that are most beneficial to $S$. Their optimization is to decide what set of common subexpressions to create and whether to maintain views in incremental or recomputation fashion. Staleness of MVs in a data warehouse setup is discussed in [12], where a coarse model to determine periodicity of refresh operation is developed.

As we will see later in the paper, our setup is different from [1,19] in the sense that multiple MVs are maintained on multiple machines in our multitenant cloud database. Moreover, different update mechanisms with different costs and staleness properties can be generated based on where the updates are shipped as well as where the intermediate relations are placed, making the problem harder than [1,19]. Next, [16] assumes that all the source relations are locally available on the same machine, which makes the application of their approach to our problem infeasible without an expensive distributed query. We combine propagation queries from [16] with *join* ordering [6], such that propagation queries involving $n$ source relations are computed in a sequence involving two relations at a time, requiring no distributed queries. In particular, we first ensure that the update mechanisms can provide SLA guarantees, after which common expressions among the various sharing arrangements are merged to reduce cost for the provider, which is similar in spirit to [14, 15]. Our work adds several additional dimensions to [14, 15] in terms of placement of relations, capacity of machines, SLA guarantee, and cost. In contrast to [12], which determines the periodicity of the refresh operation of MVs maintained in a warehouse, our work determines the admissibility of a sharing arrangement, which requires a reliable method for estimating time and expense incurred in creating and applying updates to MVs. We can estimate the cost of the refresh operation by developing an update mechanism using just four simple operators. Our work is related to traditional view selection problems [2] in the sense that the set of sharing arrangements could have been obtained via the application of a view selection algorithm taking the consumer workload as input. Our problem shares common aspects with the cache investment problem [10] in terms of placement (what and where to be cached) of intermediate results and the *goodness* (another notion of staleness) of cache. Cache refresh in [10] piggy banks on queries, whereas we establish a dedicated mechanism to keep the MVs at the desired staleness. Our work shares common elements with [11] in the sense that merging data flow paths with common tuple *lineage* is similar to the way we perform *plumbing* operations on a sharing plan.

Orchestra [17] casts data sharing as a data integration problem, where reconciling the difference in schema, formats, and trust between peers sharing data is achieved using provenance information associated with tuples. A related data sharing effort in the cloud is the FLEXSCHEME [3], where multiple versions of shared schema are maintained in the cloud, with the focus on enabling evolution of shared schema used by multiple tenants. Data markets [4] for pricing data in the cloud looks at the problem from tenant and consumer perspectives, but we look at the problem from the provider's perspective. CloudViews [9] reimagines web mashups as they migrate to a public cloud infrastructure, where a scenario similar to seamless mobility is envisioned.

3. PRELIMINARIES

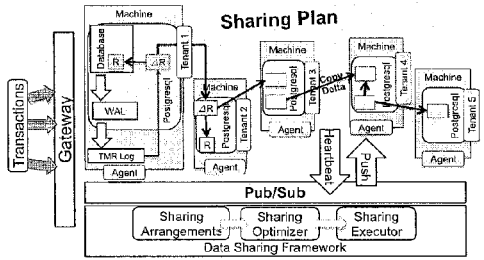

Figure 2: Architecture of the sharing framework

Figure 2 shows the block diagram of our cloud infrastructure such that tenants and consumers are assigned to one or more machines, where each machine runs a single instance Postgresql. All transactions enter our cloud infrastructure via a gateway, where they are assigned a sequence id, denoted by *xid*. Without loss of generality, our implementation uses the *epoch* time in seconds as a place holder for xid. We enabled the Streaming Replication module in Postgresql that allows the WAL log to be streamed on to another Postgresql instance that is always in recovery mode. Our custom program *fakes* itself as a Postgresql instance in recovery mode and gets a WAL stream which is concurrently unpacked and written to the disk as transactions are running on the database. Consider a transaction $t_i$ with xid $x_i$ that adds, deletes, and updates a set of tuples to a relation $R$ on the database. The effect of $t_i$ on $R$ is recorded by our custom program as an ordered set of *Tuple Modification Record* (TMR) associated with $R$ as follows: $< xid=x_i, oid=u_j, df=+/-, attributes \cdots >$, where *oid* $u_j$ is a unique object identifier assigned by Postgresql to tuples in the database. The creation or deletion action on a tuple is recorded in the *df* field, whereas all the attribute values of the tuple are appended to the end of the record. Note that a tuple update is recorded in the TMR log as a deletion followed by an insertion. The mechanism of creating TMR is shown for a single machine in Figure 2. Finally, for every relation in our databases, the last xid that modified the relation is recorded. For example, $R^a$ refers to $R$ at xid $a$, which means that all transactions up to and including xid $a$ have been applied to $R$.

Every relation $R$ in our setup is associated with a *delta* relation, denoted by $\Delta R$, which is stored as a TMR log external to Postgresql. $\Delta R$ is virtual in the sense that it is not visible to the user. $\Delta R^a$ refers to a delta relation $\Delta R$ such that the last modification of $\Delta R$ happened at xid $a$. $\Delta R_t^a$ is a TMR log sequence that records all the tuples that were created or deleted between $(t, a]$. $\Delta R(t, a]$, loosely referred to as a *chunk* of $\Delta R$ is obtained by discarding those tuples from $\Delta R_t^a$ that were both created and deleted in $(t, a]$. A *base relation* $R$ is one to which tenant's queries are directly applied, such that $\Delta R$ is updated atomically as $R$ is being modified. Figure 2 shows the mechanics of creating $\Delta R$ for a base relation $R$. On the other hand, *derived* relations (i.e., MVs) are not user facing and are created as part of the sharing arrangements. For every relation $R$, we ensure that if $R$ is present, its corresponding delta relation $\Delta R$ is also present. Note that $\Delta R$ can exist in a database without $R$ being present. We ensure the following with respect to the relative values of $a$ and $b$ for base and derived relations. Given a relation $R^b$ and its delta relation $\Delta R^a$, we have that $b \le a$. If $R$ is a *base* relation then $b$ is always maintained to be equal to $a$. Finally, for any delta relation $\Delta R$, the update rate is expressed in terms of number of TMR records per second (i.e., tuples per second) added to $\Delta R$. Moreover, the select and join selectivities of $R$ with other tenant relations in the cloud are assumed to be known.

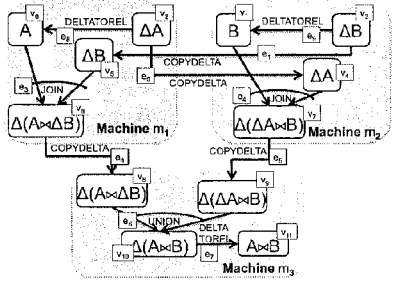

Figure 3: A sharing plan involving an in-place join of $<A, m_1>$ with $<B, m_2>$ to produce $<A \bowtie B, m_3>$. Note that xids of relations are not shown.

The update mechanism of a sharing arrangement is implemented using a *sharing plan*, which is generated by a sharing optimizer algorithm described in Section 5. A sharing plan is expressed in terms of vertices and edges forming a *Directed Acyclic Graph* (DAG). We now describe the primitives of the sharing plan by using vertices and four edge types. Vertices of the sharing plan are base or derived relations, or deltas of relations on a particular machine. For example, $\Delta R$ on machine $m_i$ forms the vertex $<\Delta R, m_1>$. Note that in some cases we may need additional information to refer uniquely to a vertex, such as identity of tenants, database name, namespace etc., in which case we will suitably expand it with additional fields. We now define edges that form *transformation* paths between the vertices in our system. An edge $e$ is defined by the following named fields, $e = \{\text{TYP}(.), \text{SRC}(.), \text{DST}(.), \text{QRY}(.)\}$. An edge $e$ is defined between one or two source vertices, denoted by the set $\text{SRC}(e)$ and exactly one destination vertex $\text{DST}(e)$. Optionally, $\text{QRY}(e)$ denotes select and project operators that can be associated with $e$. The edge type $\text{TYP}(e)$ corresponds to the one of the four edge types implemented in our system. DeltaToRel applies chunks from a delta relation to a relation. The CopyDelta copies chunks from one machine to another. The Join edge, defined between a delta relation and another relation, performs a relational join operation between them. The Union edge merges chunks from two different relations to form a single chunk. Figure 3 shows a sharing plan that performs an in-place join (*in-place* as the relations $A$ and $B$ are not copied) between a relation $A$ on machine $m_1$ and $B$ on machine $m_2$, such that $A \bowtie B$ is available on machine $m_3$. Note that the vertices in this figure consist of relations and delta of relations, whereas the edges are drawn from the four edge types.

The edges transform and move chunks from source vertices to a destination vertex and form the transformation path to enable sharing. Tuples are transformed and moved across the edges by a PUSH operator, which is implemented by all four edge types. $\text{PUSH}(e, t)$, such that $e$ is an edge and $t \in$ xid, brings the xid of the destination vertex $\text{DST}(e)$ to $t$ by transforming and transferring chunks from $\text{SRC}(e)$. Before bringing the xid of $\text{DST}(e)$ to $t$, the operator first ensures that the xids of all the source vertices in $\text{SRC}(e)$ are greater than or equal to $t$. If not, the PUSH operator fails. If $a = xid(\text{DST}(e)) \geq t$, the PUSH terminates as DST($e$) is already at (or greater than) the desired xid. Else, the chunks corresponding to $(a, t]$ from SRC($e$) are transformed based on the edge type TYP($e$) as well as the transformation specified in QRY($e$). Multiple pushes on $e$ at the same time will be serialized by the system in the order in which they are received. We will now describe the four different edge types implemented in our system.

DeltaToRel edge takes a single delta relation as the source vertex and a relation as the destination vertex, both on the same machine. For example, in Figure 3 a DeltaToRel edge $e_8$ is given by TYP($e_8$)=DeltaToRel, SRC($e_8$)={$<\Delta A^a, m_1>$}, and DST($e_8$)=$<A^b, m_1>$. PUSH($e_8, t$) first ensures that $t \leq a$ but $t > b$, in which case it inserts chunk $\Delta A(b, a]$ into $A$, after which the xid of $A$ is advanced to $t$. Note that in Figure 3, even though $A$ and $B$ are base relations, DeltaToRel edges $e_8$ and $e_9$ are defined from $\Delta A$ to $A$ and $\Delta B$ to $B$, respectively. This may seem contradictory if we consider the mechanism of how base and delta relations are updated through overlapping but separate processes as was shown in from Figure 2. Even though DeltaToRel edges seem redundant here as both delta and base relations are always maintained at the same xid by the system, we still retain the DeltaToRel edges for the completeness of data path.

CopyDelta edge is defined between delta relations on two different machines. For example, in Figure 3 a CopyDelta edge $e_0$ is given by TYP($e_0$)=CopyDelta, SRC($e_0$)={$<\Delta A^a, m_1>$}, DST($e_0$)=$<\Delta A^b, m_2>$. PUSH($e_0, t$) first ensures that $t \leq a$ but $t > b$, in which case the chunk $\Delta A(b, t]$ is transferred across the network and stored in $m_2$, after which the xid of $<\Delta A, m_2>$ is advanced to $t$.

Join edge performs a relational join operation between two source vertices -- one delta and the other base or derived relation -- applying the result to a destination vertex, which is a delta relation, such that all the vertices are on the same machine. For example, in Figure 3 a join edge $e_3$ is defined as TYP($e_3$)=Join, SRC($e_3$)={$<\Delta A^a, m_1>, <B^b, m_1>$}, DST($e_3$)=$<\Delta(\Delta A \bowtie B)^c, m_1>$. PUSH($e_3, t$) ensures that $t \leq a$, $t \leq b$ but $t > c$, and then produces a chunk given by: $\Delta(\Delta A \bowtie B)_c^t = \Delta A_c^t \bowtie B^b - \Delta A_c^t \bowtie \Delta B_c^b$, after which $\Delta(\Delta A \bowtie B)$ is advanced to $t$. The first part of the equation performs a relational join between $\Delta A^t$ and $B^b$, whereas the second part performs a compensation [18] for the mismatch in xid between $\Delta A^t$ and $B^b$. Note that the Join edge implicitly requires the existence of $\Delta B$ on the same machine as $B$, which we have already mentioned is the case.

Union edge takes two delta relation as sources vertices and applies the result to a destination vertex which is a delta relation, all on the same machine. For example, in Figure 3, a Union edge $e_6$ is defined as follows: TYP($e_6$)=Union, SRC($e_6$)={$<\Delta(\Delta A \bowtie B)^a, m_3>, <\Delta(A \bowtie \Delta B)^b, m_3>$}, DST($e_6$)=$<\Delta(A \bowtie B)^c, m_3>$. A push operation PUSH($e_6, t$) works as follows. If $t \leq a$, $t \leq b$ but $t > c$ then the chunk corresponding to $\Delta(A \bowtie B)_t^c$ is given by $\Delta(\Delta A \bowtie B)_t^c + \Delta(A \bowtie \Delta B)_t^c$, after which the xid of $\Delta(A \bowtie B)$ is advanced to $t$.

Figure 2 shows a block diagram of the proposed system that takes a set $S$ of sharing arrangements. The sharing optimizer makes a determination if a sharing in $S$ is to be admitted to the system as well as comes up with a *sharing plan* in terms of vertices and edges. The sharing executor takes the sharing plan and performs run time optimizations so that all the sharing arrangements in the system always are maintained at the desired staleness level. Each machine runs an *agent* such that it communicates with the sharing executor via a pub/sub system (e.g., activemq). The agents send periodic messages, referred to as *heartbeats*, with the xid of the vertices that the sharing optimizer is interested in. The sharing executor is aware of the staleness of all the sharing arrangements at any point in time and issues appropriate PUSH commands to the agents. The agents in turn implement PUSH commands from the sharing executor and respond back with PUSHDONE messages, indicating that the edge has been pushed.

4. SHARING PLAN

A sharing arrangement $S_i$ is internally expressed in terms of a set of source vertices SRC($S_i$), a single destination vertex DST($S_i$), transformation QRY($S_i$), staleness SLA($S_i$) in seconds, as well as a set of machines MAC($S_i$) to host $S_i$. In our sharing arrangement, QRY($S_i$) is expressed using select, project and join (SPJ) operators applied to SRC($S_i$) to obtain DST($S_i$). SLA($S_i$) specifies the acceptable level of *staleness* of the DST($S_i$) with respect to SRC($S_i$). Practically speaking, it is unrealistic for the consumer to specify the number of machines needed to host the sharing arrangement but instead the consumer specifies an *IaaS* budget (e.g., Amazon EC2), which is converted to a set of machines of certain capacities by the provider. In particular, MAC($S_i$) is the set of machines that the provider will add to the cloud infrastructure (or make available existing machines with spare capacities) to host the vertices and edges of the sharing plan.

Given any $S_i$, our system implements $S_i$ using a *sharing plan*. Moreover, there can be several alternate sharing plans that can implement $S_i$, however not all of them satisfy the constraints we will develop in the reminder of this section. It is not difficult to see that any given SPJ transformation, specified by QRY($S_i$), can be expressed using a sharing plan such that the vertices are either relations or delta of relations, and the edges are drawn from a minimal set of four edges (i.e., CopyDelta, Join, DeltaToRel, Union). Note that select and project operators if present in QRY($S_i$) are handled using a similar approach to the *pushdown* hueristic. We provide the following lemma without a proof.

LEMMA 1. *A sharing arrangement $S_i$ that performs a SPJ transformation QRY($S_i$) on SRC($S_i$) to produce DST($S_i$) can be implemented using a set of vertices and edges drawn from the four edge types.*

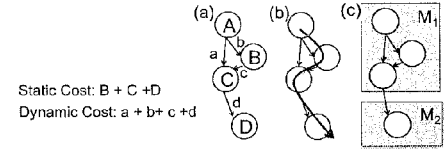

Static Cost: B + C +D
Dynamic Cost: a + b+ c +d

Figure 4: (a) Cost and (b) critical time path, and (c) capacity consumed by a sharing plan

Note that given a sharing arrangement, there can be several possible sharing plans that implement it, all with different properties. In particular, we concern ourselves with three key properties of a sharing plan, namely cost, critical time path and capacity consumed. Figure 4a shows the *cost* of the sharing plan, expressed in dollars per second, as the sum of the cost to create and maintain all the vertices and edges at the desired staleness level, whereas Figure 4b shows the *critical time path* of the sharing plan, which is the longest path in terms of seconds that represents the most time consuming data transformation path. Finally, Figure 4c shows the *capacity consumed* by the sharing plan on each of the machines specified in the sharing arrangement.

The cost of a sharing plan, expressed in dollars per second, is computed by the amount of machine, network, and disk capacity consumed per second to keep sharing arrangement at the desired staleness level. This can be expressed as the sum of two components, namely a *static* cost, which represents an initial investment to set up derived relations, and a *dynamic* cost, which is the expense incurred to move tuples through the edges. For example in Figure 3, static cost is incurred creating vertex $<A \bowtie B, m_3>$, which requires

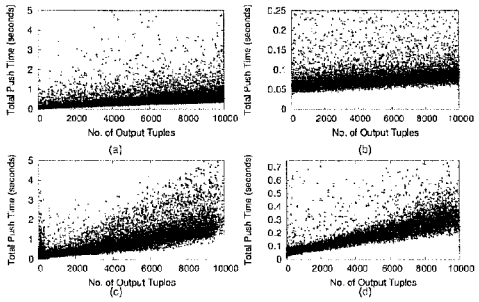

Figure 5: Time cost model of the four edge types, namely a) DeltaToRel, b) CopyDelta, c) Join, and d) Union significant processing, data movement and storage costs. The static cost of a sharing plan is converted to a dollar per second by dividing each cost component (e.g., machine, network, disk) by *recoup* constant depending on how the IaaS charges (e.g., per hour, per month, per GB etc.) these resources. For example, Amazon EC2 charges for storage on a per month basis, while computing resources on an hourly basis. The recoup constant in this case could be the number of seconds in a month for storage and number of seconds in an hour for computing resources. Note that we *over provision* the storage for base and derived relations to account for their increase in size during the period corresponding to the recoup constant. Next, the dynamic cost is calculated in terms of the number of tuples stored, moved across the network and the machine capacity consumed in generating and moving the tuples per second through the edges in the sharing plan. A function COMPUTEDOLLARCOST is suitably implemented such that given a sharing plan it can compute the total cost in dollars per second needed to setup as well as maintain a sharing arrangement.

The *critical time path* of a sharing plan is the longest path in terms of time taken to push tuples from source vertices of the sharing plan to the destination vertex. Note that the length of the critical time path should be less than the SLA of the sharing arrangement or else the system cannot maintain the sharing arrangement. We have developed a simple model for each edge type to estimate the time taken to push varying number of tuples through them. Our setup to compute a time model consisted of two machines with 15 base relations of varying sizes between 200k and 50 million tuples, number of attributes from 1 to 7 as well as different attribute types. Derived relations were obtained by joining different base relations so that the edge types would be used in the transformation of different kinds of tuples. We applied a *random* workload that pushed a varying number of tuples between 1 and 10k through each edge in the setup. We then measured the time taken to perform each PUSH operation, which is recorded in Figure 5. It can be seen that the time taken to push tuples through different edge types is *linear* in the number of tuples for all the edge types, which forms the basis of our time cost model. A function CRITICALTIMEPATH is implemented in the system that uses the time cost model for each of the edge types and computes the critical time path of a sharing plan.

For each of the sharing arrangements $S_i$, the provider adds a set MAC($S_i$) of machines to the infrastructure (or assigns machines with significant spare capacities) to host the vertices and edges. Let CAP$^{S_i}$ be the spare *capacity vector*, such that $m_i \in$ MAC($S_i$) has a spare capacity CAP$_{m_i}^{S_i}$, represented in terms of available CPU, disk, network etc. We use dedicated (or lightly loaded) machines to host the sharing arrangements to avoid unfavorable interactions between the PUSH operations and tenant-consumer queries that may be running on a shared machine in the infrastructure, as this may affect our SLA guarantees. However, such interactions are not completely unavoidable on machines hosting the source vertices as they run the tenant workload and at the machine hosting the destination vertex as they run the consumer workload. We employ the following two strategies to reduce this interaction. First, if a machine has several outgoing CopyDelta edges from the same delta relation as shown in Figure 6a, we PUSH all the edges simultaneously so that a chunk is read from disk only once resulting a shared scan. Next, if the tenant-consumer workload is overloading a machine as shown in Figures 6b-c, our sharing framework can create multiple replicas maintained at a small staleness so that the tenant-consumer workload can be *load balanced*. The goal here is to ensure that all the machines involved in the sharing arrangement are not too heavily loaded as guaranteeing SLA guarantees in such a setup becomes a really hard problem. Our work does not consider interactions between multiple PUSH operators running simultaneously on a machine, thereby affecting one another's performance. In this context, the work in [8], which proposes a scheduling algorithm to reduce resource contention between operators (such as PUSH) requiring multiple resources (e.g., CPU, network, disk), can be implemented by our sharing executor.

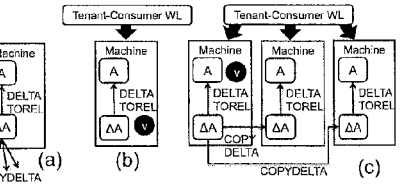

Figure 6: PUSH and workload interaction reduced by (a) pushing outgoing CopyDelta edges simultaneously, and (b) replacing overloaded machine hosting $v$ with a load balanced setup in (c)

Given a machine $m_i$ with initial spare capacity of CAP$_{m_i}$, each vertex on $m_i$ or each outgoing and incoming edge on or from $m_i$ consumes certain capacity from $m_i$. We assume that a function REDUCECAPACITY(CAP$_{m_i}$, set of $v$ (or $e$)) is suitably implemented such that it reduces the capacity of $m_i$ when vertex $v$ or edge $e$ is added to $m_i$. Without loss of generality, we represent the machine capacity by the maximum number of tuples per second (e.g., 25k tuples/sec) that the machine can handle. We then assume the uniformity of all tuples, and express the capacity consumed by a PUSH operation using the number of tuples it manipulates per second.

*Staleness and* PUSH. One way of expressing the staleness of DST($S_i$) is using the difference between the xid values of DST($S_i$) and the sources SRC($S_i$). In other words, STLN($S_i$) = MAXXID(SRC($S_i$)) − xid(DST($S_i$)), where MAXXID(SRC($S_i$)) is the maximum xid among the source vertices. If STLN($S_i$) > SLA($S_i$), then $S_i$ is stale. The PUSH operator reduces the staleness of a sharing arrangement and works as follows. Suppose, $D_i$ is a sharing plan that implements $S_i$. PUSH($S_i$, $x$) operator advances the xid of all the vertices in $D_i$ (in particular, DST($S_i$)) to be $\geq x$. PUSH($S_i$, $x$) ensures that all the source vertices of MINXID(SRC($S_i$)) $\leq x$, where MINXID returns the minimum xid of a set of vertices. Next, all the edges forming $D_i$ are pushed in a *topological* order until DST($S_i$) is advanced to $x$. Once the sharing $S_i$ is advanced to xid $x$, the staleness of DST($S_i$) is potentially reduced with respect to SRC($S_i$).

Our definition of staleness requires one minor modification without which a sharing arrangement can potentially always remain stale. If the sharing arrangement contains a source vertex that has not been updated in a long time (i.e., MINXID(.) is consequently old), it causes the sharing arrangement always to be stale. The solution to this problem requires distinguishing between the case that no updates have been made on the relation versus the case where updates are missing. In particular, we can periodically advance the xid of base relations to be the current xid, but cannot do so for derived relations as that indicates system failure.

5. SHARING OPTIMIZER

Given a sharing arrangement $S_i$, the sharing optimizer can generate several different sharing plans that implement $S_i$. Sharing plans that have a critical time path greater than $SLA(S_i)$ cannot be maintained by the system at the desired staleness level and hence are not *admissible*. Similarly, if a sharing plan exceeds the capacity of a machine by virtue of placing too many vertices and edges on it, it also is not admissible. The admissibility of sharing plans forms a *hard constraint* of our problem in the sense that the sharing optimizer should not admit a sharing arrangement that cannot be handled by the system. At the same time, the sharing optimizer also should not deny admitting sharing arrangements that otherwise should have been admissible. The goal of the sharing optimizer is to produce a sharing plan that is admissible, has a low *cost* to setup and can be maintained by the system at the desired level of staleness. Once a sharing arrangement has been admitted into the system, an opportunity for reducing the cost further presents itself if two different sharing arrangements share similar vertices and edges in their sharing plan. The provider can take advantage of this *commonality* between sharing arrangements to further reduce the cost. In the following, we will propose a method for generating admissible plans for a sharing arrangement by using a dynamic programming method. Once admissible sharing plans have been generated, we use a greedy hill climbing algorithm to reduce the cost for the provider by taking advantage of the commonality between the sharing plans.

5.1 Admissible Sharing Plans

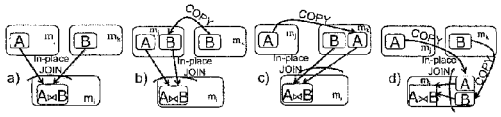

Figure 7: Four ways of joining relation $A$ and $B$ on different machines

The sharing optimizer is based on the polynomial time heuristic solution developed for System-R [6] and its analogous distributed variant R* [13], which form the basis of modern-day query optimizer. Our sharing optimizer algorithm uses a dynamic programming approach for establishing the join ordering. Given that our algorithm joins over relations on different machines such that the output of the join can be placed on another machine, there are several possible ways of performing them, resulting in sharing plans with different properties. For instance, performing as many operations in parallel at the same time may produce a sharing plan with a small critical time path but with a high dollar cost, whereas operations can be performed in such a way to reduce the dollar cost at the expense of a high critical time path. Similar, although not identical, set of optimizations are explored in the R* [13] optimizer, which forms the basis of our algorithm. Note that a sharing arrangement in our setup specifies a set of machines along with their capacities. An admissible sharing plan should not violate the capacity of any of the machines. We have extended the join ordering algorithm to explore the space of all possible *placement* of intermediate results, while still retaining the flavor of the R* approach.

At a high level, we consider four ways of performing a join between a vertex $<A, m_j>$ and another vertex $<B, m_k>$ to produce vertex $<A \bowtie B, m_i>$, with varying static and dynamic dollar costs, which are illustrated in Figure 7. The JOINCOST function (Equation 1) computes the cheapest cost of creating a join sequence $R$ on machine $m_i$ (i.e., $<R, m_i>$) by joining with a sequence $R-a$ on $m_j$ (i.e., $<R-a, m_j>$) with relation $a$ on machine $m_k$ (i.e., $<a, m_k>$), iterating over all machines $m_j, m_k \in MAC(S_i)$. $CAP^{<R, m_i>}$ is the remaining capacity of machines after creating $<R, m_i>$, whereas $D^{<R, m_i>}$ is the cheapest sharing plan to create $<R, m_i>$, using a cost function that will be specified later. JOINCOST uses two functions, INPLACEJOINCOST which computes the cost of performing an in-place join and COPYRELATIONCOST which computes the cost of creating copies of relations, are described below.

$$\text{JOINCOST}(R, m_i, CAP^{<R,m_i>}, D^{<R,m_i>}) =$$
$$\min_{\forall m_j, m_k} \text{JOINCOST}(R - a, m_j, CAP^{<R-a,m_j>}, D^{<R-a,m_j>}) +$$
$$\begin{cases} (a) \{ \text{INPLACEJOINCOST}(R - a, m_j, a, m_k, m_i, CAP^{<R-a,m_j>}, D^{<R-a,m_j>}) \\ (b) \begin{cases} \text{COPYRELATIONCOST}(R - a, m_j, m_k, CAP^{<R-a,m_j>}) + \\ \text{INPLACEJOINCOST}(R - a, m_k, a, m_k, m_i, CAP^{<R-a,m_j>}, D^{<R-a,m_j>}) \end{cases} \\ (c) \begin{cases} \text{COPYRELATIONCOST}(a, m_k, m_j, CAP^{<R-a,m_j>}) + \\ \text{INPLACEJOINCOST}(R - a, m_j, a, m_j, m_i, CAP^{<R-a,m_j>}, D^{<R-a,m_j>}) \end{cases} \\ (d) \begin{cases} \text{COPYRELATIONCOST}(a, m_k, m_i, CAP^{<R-a,m_j>}) + \\ \text{COPYRELATIONCOST}(a, m_j, m_i, CAP^{<R-a,m_j>}) + \\ \text{INPLACEJOINCOST}(R - a, m_i, a, m_i, m_i, CAP^{<R-a,m_j>}, D^{<R-a,m_j>}) \end{cases} \end{cases}$$
(1)

The COPYRELATIONCOST function takes a sharing plan $D$ and machine capacities $CAP^D$ as inputs, and creates a copy of a vertex $<A, m_1>$ on another machine $m_2$ (i.e., $<A, m_2>$), while suitably updating $D$ and $CAP^D$. Before creating $<A, m_2>$, we first ensure that $<A, m_2>$ does not exist in $D$, and if it does, the function terminates without updating $D$ or $CAP^D$. To create a copy of $A$ on $m_2$, two vertices – $<A, m_2>$ and $<\Delta A, m_2>$ – and two edges – CopyDelta between $<\Delta A, m_1>$ and $<\Delta A, m_2>$, and DeltaToRel between $<\Delta A, m_2>$ and $<A, m_2>$ – are added to $D$, provided there is available capacity in $m_1$ and $m_2$. The capacities of machines $m_1$ and $m_2$, i.e., $CAP^D_{m_1}$ and $CAP^D_{m_2}$, are modified using the REDUCECAPACITY function. If there is no capacity left in $m_1$ or $m_2$ to accommodate the additional vertices and edges, the cost of the sharing plan is set to $\infty$. Else, the cost, the updated sharing plan and the machine spare capacities are returned.

---

1: sub COPYRELATIONCOST($A, m_1, m_2, CAP^D, D$)
    /* Add $<A, m_2>$ updating capacity $CAP^D$ and $D$ */
2:  $v_0 = <\Delta A, m_1>, v_1 = <A, m_2>, v_2 = <\Delta A, m_2>$
3:  CopyDelta $e_1 = v_0 \to v_1$, DeltaToRel $e_2 = v_1 \to v_2$
4:  if $D$.DOESNOTCONTAIN($<A, m_2>$) then
5:     /* return cost $= \infty$ if $CAP^D_{m_1}$ or $CAP^D_{m_2}$ has no capacity left */
6:     REDUCECAPACITY($CAP^D_{m_1}, \{e_1\}$)
7:     REDUCECAPACITY($CAP^D_{m_2}, \{v_2, e_1, e_2\}$)
8:     $D$.ADD($v1, v2, e_1, e_2$)
9:  end if
10: return (COMPUTECOST($D$), $CAP^D, D$)

---

Function INPLACEJOINCOST takes two vertices $<A, m_1>$ and $<B, m_2>$ and produces a join $<A \bowtie B, m_3>$ of the two vertices. The in-place join of two vertices is shown in Figure 3 and can add up to 8 additional vertices and 8 edges depending on whether $m_1, m_2$ and $m_3$ are all distinct machines, or not. Function INPLACEJOINCOST works similar to the COPYRELATIONCOST in the sense that it first checks to see if $<A \bowtie B, m_3>$ does not exist in $D$ after which it adds the additional vertices and edges to $D$. Also, the capacities of $m_1, m_2$ and $m_3$ are appropriately reduced and the cost is set to $\infty$ if the capacity of any of the machines is exceeded. If not, the function returns the updated sharing plan as well as the modified machine capacity.

Finally, the GENERATESHARINGPLAN algorithm takes a sharing arrangement $S_i$ and the TYPE of algorithm to generate. The TYPE can be set to be either DPD or DPT, which determines the nature of the sharing plan that will be produced by the algorithm (lines 3–7). If the DPD flag is set, COMPUTECOST uses COMPUTEDOLLARCOST to compute cost. Recall that COMPUTEDOLLARCOST function described in Section 4 is the sum of static and dynamic costs of a sharing plan in dollars per second. The resulting sharing plan that is produced is referred to us the DPD sharing plan. On the other hand, the DPT flag makes the COMPUTECOST use the CRITICALTIMEPATH function (described in Section 4), which is the total time along the longest data path

```
1: sub INPLACEJOINCOST(A, m_1, B, m_2, m_3, CAP^D, D)
   /* In-place join of <A, m_1> with <B, m_2> to produce <A ⋈ B, m_3> updating
      CAP^D and D , refer to Figure 3 */
2: vertex v_0 = <A, m_1>, v_1 = <B, m_2>, v_2 = <ΔA, m_1>, v_3 = <ΔB, m_2>,
   v_4 = <ΔA, m_2>, v_5 = <ΔB, m_1>, v_6 = <Δ(A ⋈ ΔB), m_1>,
   v_7 = <Δ(ΔA ⋈ B), m_2>, v_8 = <Δ(A ⋈ ΔB), m_3>, v_9 =
   <Δ(ΔA ⋈ B), m_3>, v_10 = <Δ(A ⋈ B), m_3>, v_11 = <A ⋈ B, m_3>;
3: edge CopyDelta e_0 = v_2 → v_4, e_1 = v_3 → v_5, e_4 = v_6 → v_8, e_5 = v_7 → v_9;
   Join c_3 = {v_0, v_5} → v_6, c_4 = {v_1, v_4} → v_7; Union e_6 = {v_8, v_9} →
   v_10; DeltaToRel c_7 = v_10 → v_11, c_8 = v_2 → v_0, c_9 = v_3 → v_1
4: if D.DOESNOTCONTAIN(<A ⋈ B, m_3>) then
5:    L = {v_2 ··· v_11, e_0 ··· e_9}
6:    /* Prune vertices and edges from L, based on m_1 = m_2, m_1 = m_3, m_2 =
       m_3, or m_1 = m_2 = m_3 */
7:    D.ADD(L) /* Ensuring vertex/edge in L already not in D */
8:    REDUCECAPACITY(CAP^D_m, L), ∀m ∈ {m_1, m_2, m_3}, /* return cost = ∞
      if m has no capacity left */
9: end if
10: return (COMPUTECOST(D), CAP^D, D)
``` in the sharing plan. The resulting sharing plan that is produced is referred to as the DPT sharing plan. Note that the DPD sharing plan has a *low* dollar cost, whereas the DPT sharing plan has a *low* critical time path. The GENERATESHARINGPLAN algorithm works as follows. The main body of the algorithm (lines 8–14) computes the cheapest way to build all join sequences of length $1 < x \leq |SRC(S_i)|$ on all machines in $MAC(S_i)$ using vertices in $SRC(S_i)$, which is reused in the next iteration to compute join sequences of length $x + 1$. Finally, a sharing plan produced by the algorithm is admissible if the cost is not ∞ and if the critical time path is less than or equal to $SLA(S_i)$ (lines 15–19).

The sharing optimizer generates both DPD and DPT sharing plans. If the DPT sharing plan is not admissible, then it means that there *may* not exist a sharing plan of $S_i$ that is admissible and hence, $S_i$ is *rejected* by the provider. If DPD and DPT are both admissible, the sharing optimizer uses DPD, as it has a lower cost than DPT.

```
1: sub GENERATESHARINGPLAN(S_i, TYPE)
   /* S_i is sharing arrangement, TYPE can be DPT or DPD */
2: ∀m ∈ MAC(S_i): CAP^<0,m> = CAP^S_i, D^<0,m> = SRC(S_i), /* Initialize for subset
   of length 0 */
3: if TYPE = DPD then
4:    /* COMPUTECOST(D) returns COMPUTEDOLLARCOST(D) */
5: else if TYPE = DPT then
6:    /* COMPUTECOST(D) returns CRITICALTIMEPATH(D) */
7: end if
8: for x = 1 TO ··· |SRC(S_i)| do
9:    for R ∈ all x length subsets of SRC(S_i) do
10:      for m ∈ all machines in MAC(S_i) do
11:         compute JOINCOST(R, m, CAP^<R,m>, D^<R,m>)
12:      end for
13:   end for
14: end for
15: if COMPUTECOST(D^DST(S_i)) ≠ ∞ and CRITICALTIMEPATH(D^DST(S_i)) ≤
    SLA(S_i) then
16:   return D^DST(S_i)
17: else
18:   /* S_i is not admissible (Add more machines or simplify QRY(S_i))*/
19: end if
```

5.2 Hill Climbing Algorithm

Let $S$ be the set of admitted sharing arrangements such that $D_i$ is the sharing plan of $S_i \in S$ that has been generated by the sharing optimizer. $D$ is the sharing plan obtained by merging all the sharing plans and then discarding duplicate edges and vertices. Now, each vertex and edge $v$ can be associated with multiple sharing arrangements, such that $SHR(v)$ is the set of sharing arrangements in $S$ to which $v$ belongs. Given a vertex $v$, let $ANS(v)$ be the set of vertices and edges that are ancestors of $v$ in $D$. In the following, we appeal to the *commonality* between the sharing arrangements to reduce the cost for the operator. What we mean by commonality here is that we can replace two disjoint sets of vertices and edges belonging to different sharing arrangements that perform identical or similar transformation with a common set that is shared by multiple sharing arrangements. In other words, we *plumb* together vertices, say $v_1$ and $v_2$, belonging to different sharing arrangements so that rather than retaining two separate sets of vertices and edges to supply input tuples to $v_1$ and $v_2$, we merge them into a common set. In particular, if we plumb $v_1$ and $v_2$ together, the vertices and edges that supply $v_2$ (or $v_1$) are retained but those supplying $v_1$ (or $v_2$) are discarded, resulting in savings for the provider.

A plumbing operation $V_i$ on $D$ is defined between a set of source vertices $SRC(V_i)$ and another set of destination vertices $DST(V_i)$ such that after the plumbing operation $DST(V_i)$ gets tuples via $SRC(V_i)$. A plumbing operation $V_i$, when applied between two vertices in $D$ reduces the total cost of $D$. On the other hand, it can potentially increase the critical path time of all sharing arrangements belonging to $SHR(DST(V_i))$. Note that we can perform as many plumbings as possible in $D$ as long as it does not cause the critical time path of any of the sharing arrangements involved to exceed their SLA. We only consider the following two kinds of plumbing operations in this paper, which are shown in Figures 8a–b, although any kind of plumbing can be defined as long as $BNF(V_i) > CST(S_i)$ and the correctness of the sharing plan is not compromised.

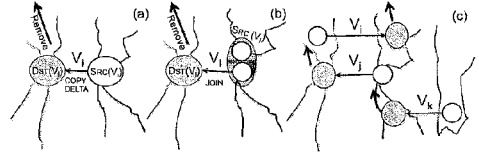

Figure 8: Types of plumbings (a) CopyDelta and (b) Join and (c) how plumbings can affect one another

1. *Copy Plumbing:* Takes two delta vertices on different machines and adds a CopyDelta edge between them.
2. *Join Plumbing:* Takes two vertices – a delta and a relation – and performs a join to plumb a destination delta vertex. This is done by adding two delta relations, a Join edge and up to two CopyDelta edges. For example, $\Delta A \bowtie B$ can be plumbed using $A$ and $\Delta B$ by adding extra vertices and edges.

Let $V$ be the set of every possible plumbing that can be performed in $D$, such that $V_i \in V$. In performing $V_i$ on $D$, there is a potential cost benefit $BNF(V_i)$ (i.e., cost reduction) due to the removal of vertices from $D$ as well as additional cost $CST(V_i)$ due to the possible need to add extra edges and vertices to facilitate $V_i$. Moreover, performing $V_i$ can also increase the critical time path of all the sharing arrangements in $SHR(DST(V_i))$ by $TIMEINC(V_i)$. Let the time slack of $SLK(S_i)$ of $S_i$ be defined as $SLA(S_i) - CRITICALTIMEPATH(D_i)$. The slack of $S_i$ determines how many plumbing operations can be performed on it in the sense that larger the value of $SLK(S_i)$, more is the number of plumbings that can be performed on it. A plumbing operation $V_i$ is feasible only if $BNF(V_i) > CST(V_i)$. In other words, $V_i$ is applied on $D$ only if there is a reduction of the total cost to the provider in performing $V_i$. Furthermore, $V_i$ should not cause the critical time path of any of the sharing arrangements in $SHR(DST(V_i))$ to exceed their SLA. A plumbing operation $V_i$ is implemented as follows.

1. Before performing $V_i$, ensure that $BNF(V_i) - CST(V_i) > 0$ and $\forall S_j \in SHR(DST(V_i))$, $SLK(S_i) \geq TIMEINC(V_i)$.
2. For all vertices and edges $v \in ANS(DST(V_i))$, remove $SHR(DST(V_i))$ from the $SHR(v)$. In other words, remove the sharing arrangements associated with $DST(V_i)$ from all the vertices and edges currently supplying $DST(V_i)$ with tuples.

3. For all $v \in \text{ANS}(\text{SRC}(V_i))$, add $\text{SHR}(\text{DST}(V_i))$ to $\text{SHR}(v)$. Add $\text{SHR}(\text{DST}(V_i))$ to $\text{SHR}(\text{SRC}(V_i))$.
4. Remove vertices and edges $v \in \text{ANS}(\text{DST}(V_i))$ s.t., $\text{SHR}(v) = \emptyset$. Benefit $\text{BNF}(V_i)$ is the dollar amount saved due to the removal of these vertices and edges. Reduce slack of all $S_j \in \text{SHR}(\text{DST}(V_i))$ by $\text{TIMEINC}(V_i)$.

An optimal solution for this problem is one that selects a subset of plumbings from $V$, such that the profit is maximized without exceeding the slack of any of the sharing arrangements. However, this is a hard problem due to the observation that plumbings can affect one another's benefit, cost and slack consumption. Figure 8c shows an example with three plumbings $V_i$, $V_j$ and $V_k$ such that they affect one another's $\text{BNF}(.)$ and $\text{TIMEINC}(.)$ values. For example, $V_i$ cannot be applied if $V_j$ already has been applied to $D$. Moreover, $V_i$, $V_j$ and $V_k$ affect each other's benefit and cost values, which makes the order of applying these operations important. An optimal algorithm that chooses a subset of plumbings turns out to be NP-hard, which we show by using a reduction from the *Generalized Assignment Problem (GAP)* [7]. Due to lack of space, we provide only a proof *sketch* below.

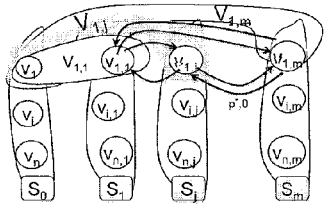

Figure 9: Reduction of GAP problem

LEMMA 2. *An optimal algorithm that produces a set of plumbing operations to perform resulting in a provably maximum profit, while satisfying the SLA of all the sharing arrangements is NP-hard.*

PROOF. GAP [7] is defined as follows. The input is a set $M$ of $m$ machines, such that $C_j$ is the capacity of machine $M_j$. We are given a set $J$ of $n$ jobs that has to be scheduled on $m$ machines. The time taken and the profit in scheduling a job are dependent on the machine to which the job is assigned. Scheduling $J_i$ on $M_j$ consumes capacity of $t(i, j)$, while generating a profit of $p(i, j)$. GAP requires that every job is assigned to one of the machines such that the profit is maximized without exceeding the capacity of the machine.

The reduction of GAP to the optimal plumbing problem is as follows. Each machine in GAP becomes a sharing arrangement in the plumbing problem, such that $S_j$ corresponds to machine $M_j$. $S_0$ is a dummy sharing arrangement with a very large slack. For every job $J_i \in J$, we create a vertex $v_{i,0}$ on $S_0$. Next, we create $m$ vertices, one per sharing arrangement, such that $v_{i,j}$ is a vertex on sharing arrangement $S_j$ for $1 \leq j \leq m$. Next, $m$ plumbing operations are defined such that $V_{i,j}$ is defined as $\text{SRC}(V_{i,j}) = \{v_{i,0}\}$, $\text{DST}(V_{i,j}) = \{v_{i,j}\}$, $\text{BNF}(V_{i,j}) = p(i, j)$ and $\text{TIMEINC}(V_{i,j}) = t(i, j)$. We now add *filler* plumbings from $v_{i,j}$ to $v_{i,k}$, $\forall k > 1, k \neq j$. The benefit $\text{BNF}(.)$ of a filler plumbing is set to $p^*$, such that $p^*$ is chosen to be larger than $p(i, j), \forall i, j$. The $\text{CST}(.)$ and $\text{TIMEINC}(.)$ values are set to 0. In other words, the filler plumbings have a large benefit but do not consume any slack. We add the remaining jobs as described above, while ensuring that plumbing corresponding to $V_{i,j}$ does not affect (nor is affected by) other plumbings $V(l, j)$, where $l \notin i$. An optimal plumbing algorithm would choose at most one (or none in which case $J_i$ is not scheduled) of the plumbings among $V_{i,1} \cdots V_{i,m}$ and exactly $m - 1$ of the filler plumbings for every job $J_i$ so that profit is maximized, while ensuring that the the slackness of the sharings are not exceeded. The solution of the optimal plumbing algorithm corresponds to the GAP assignment. □

The optimal algorithm is NP-hard, but for our purposes here it is not critically important to obtain the cheapest sharing plan as a plan that is cheaper than $D$ is good enough. Moreover, the problem at hand may be so hard that it is likely that a c-approximation solution does not exist. Hence, we resort to a simple strategy such as *greedy*, which at least has the desirable property that it is fast to execute and intuitive to understand. The greedy hill climbing algorithm at each iteration first computes $V$ and applies the plumbing operation $V_i$ that maximizes the total profit (i.e., $\max(\text{BNF}(V_i) - \text{CST}(V_i))$) for the provider, while not violating the staleness SLA of any of the sharing arrangements. The algorithm terminates when no more plumbing operation can be applied to $D$. The resulting sharing plan forms the input to the sharing executor.

6. SHARING EXECUTOR

The sharing executor of our system is akin to a query processing engine in that given a set $S$ of sharing arrangements and a sharing plan $D$ produced by the sharing optimizer, it executes $D$ in the most efficient manner to maximize profit (by reducing operating cost) for the provider. The sharing executor applies its own set of run time optimizations, some of which are briefly described.

The design of a sharing executor is simplified due to the observation that any sharing arrangement $S_i \in S$ can be pushed independently of the other sharing arrangements in $S$ even though they may have common edges and vertices. The rationale for it is as follows. Suppose $e$ is an edge such that $\text{DST}(e)$ is currently at a xid of $t$, such that there are two concurrent PUSH commands to advance $\text{DST}(e)$ to $t_1$ and $t_2$, $t \leq t_1 \leq t_2$, respectively. Regardless of which PUSH command is executed first by $e$, the amount of work done by $e$ is equal to the work done to advance $\text{DST}(e)$ to $t_2$.

A simple design of a sharing executor pushes all the sharing arrangements in $S$ every second so that they do not violate their SLA. Suppose that $D_i \subseteq D$ is the sharing plan of $S_i$ and $E_i$ is the set of edges forming $D_i$. Given that the $\text{CRITICALTIMEPATH}(D_i)$ is less than $\text{SLA}(S_i)$, we are guaranteed that $S_i$ will be maintained at a desired level of staleness if the sharing executor pushes once every second. In particular, the sharing executor obtains $x = \text{MINXID}(\text{SRC}(S_i))$ once each second. It spawns a thread that performs $\text{PUSH}(S_i, x)$, which is implemented as a sequence of $\text{PUSH}(e, x)$ of all edges $e \in E_i$ in a topological order. This approach suffers from the drawback that the sharing executor is constantly pushing the sharing arrangements. Moreover, each PUSH command does little work to justify the effort in setting it up.

An improved design of a sharing executor takes advantage of the observation that the provider makes the exact same profit as long as the staleness is below the SLA. So, instead of an aggressive approach such as PUSH every second, it makes good sense to PUSH as infrequently as possible just enough to maintain the staleness of the sharing arrangements below the SLA. In particular, the improved sharing executor does not push every second but rather bunches up enough work, and issues a PUSH at the appropriate moment so that it completes before $S_i$ becomes stale. This leads us to the design of a *lazy* sharing executor, which uses a simple model to determine two key questions: 1) Is it time to push $S_i$? 2) By how much xid to push $S_i$ by?. First of all, the sharing executor is modified so that it keeps track of the existing capacities of the machines based on how many PUSH commands have been dispatched to (but not heard from) each of the machines. Next, we modify $\text{CRITICALTIMEPATH}(S_i, t)$ to take an additional parameter $t$, which corresponds to the xid amount to advance $\text{DST}(S_i)$. Note that $t$ in $\text{CRITICALTIMEPATH}(S_i, t)$ was defaulted to 1 before, although now it take up any arbitrary value greater than or equal to 1. Finally, we want to determine an appropriate xid value $x \in$ xid to advance $\text{DST}(S_i)$, such that $\text{xid}(\text{DST}(S_i)) < x \leq \text{MINXID}(\text{SRC}(S_i))$. A suitable value of $x$ is such that $\text{PUSH}(S_i, x)$ completes before $S_i$ violates the staleness SLA, which is captured by the following: $(\text{MAXXID}(\text{SRC}(S_i)) +$ Table 1: Twitter base relations (top left) along update rates (bottom right). Twenty-five sharing arrangements (top right) along with sharing plan (bottom left) containing 187 vertices and 178 edges on 6 machines.

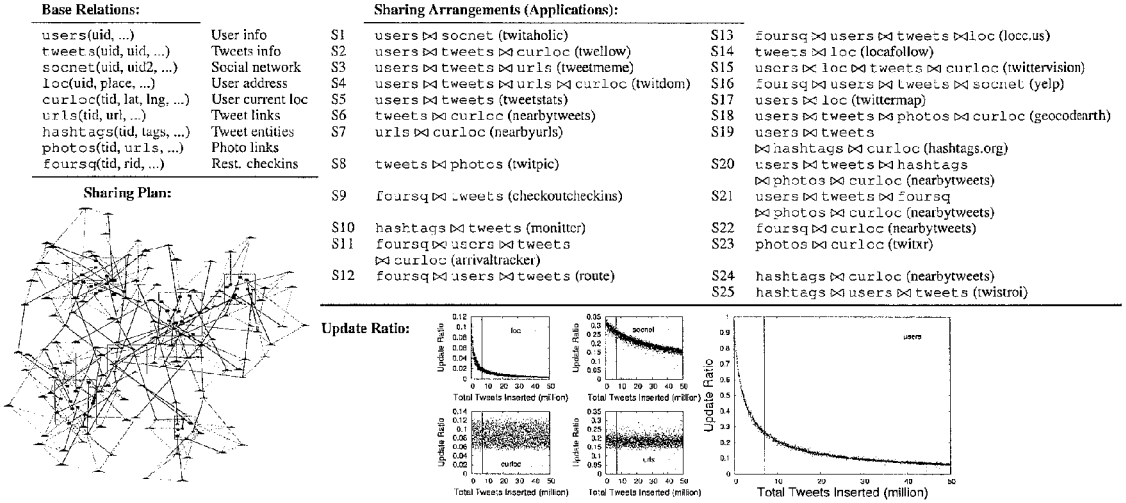

| Base Relations: | | | Sharing Arrangements (Applications): | | | |
|---|---|---|---|---|---|---|
| users(uid, ...) | User info | S1 | users ⋈ socnet (twitaholic) | S13 | foursq ⋈ users ⋈ tweets ⋈ loc (locc.us) |
| tweets(uid, uid, ...) | Tweets info | S2 | users ⋈ tweets ⋈ curloc (twellow) | S14 | tweets ⋈ loc (locafollow) |
| socnet(uid, uid2, ...) | Social network | S3 | users ⋈ tweets ⋈ urls (tweetmeme) | S15 | users ⋈ loc ⋈ tweets ⋈ curloc (twittervision) |
| loc(uid, place, ...) | User address | S4 | users ⋈ tweets ⋈ urls ⋈ curloc (twitdom) | S16 | foursq ⋈ users ⋈ tweets ⋈ socnet (yelp) |
| curloc(tid, lat, lng, ...) | User current loc | S5 | users ⋈ tweets (tweetstats) | S17 | users ⋈ loc (twittermap) |
| urls(tid, url, ...) | Tweet links | S6 | tweets ⋈ curloc (nearbytweets) | S18 | users ⋈ tweets ⋈ photos ⋈ curloc (geocodearth) |
| hashtags(tid, tags, ...) | Tweet entities | S7 | urls ⋈ curloc (nearbyurls) | S19 | users ⋈ tweets ⋈ hashtags ⋈ curloc (hashtags.org) |
| photos(tid, urls, ...) | Photo links | | | | |
| foursq(tid, rid, ...) | Rest. checkins | S8 | tweets ⋈ photos (twitpic) | S20 | users ⋈ tweets ⋈ hashtags ⋈ photos ⋈ curloc (nearbytweets) |
| | | S9 | foursq ⋈ tweets (checkoutcheckins) | S21 | users ⋈ tweets ⋈ foursq ⋈ photos ⋈ curloc (nearbytweets) |
| | | S10 | hashtags ⋈ tweets (monitter) | S22 | foursq ⋈ curloc (nearbytweets) |
| | | S11 | foursq ⋈ users ⋈ tweets ⋈ curloc (arrivaltracker) | S23 | photos ⋈ curloc (twitxr) |
| | | S12 | foursq ⋈ users ⋈ tweets (route) | S24 | hashtags ⋈ curloc (nearbytweets) |
| | | | | S25 | hashtags ⋈ users ⋈ tweets (twistroi) |

CRITICALTIMEPATH($S_i, x$ − xid(DST($S_i$)))) − $x \leq$ SLA($S_i$), with the implicit assumption that by the time the PUSH command finishes, MAXXID(SRC($S_i$)) would be at MAXXID(SRC($S_i$)) + CRITICALTIMEPATH($S_i, x$ − xid(DST($S_i$))). But on the other hand, the sharing executor does not want to push too *early* as well. In other words, the sharing executor is early if the PUSH command could have waited a bit longer and still could have completed before $S_i$ became stale. This can be stipulated by adding the additional constraint that: $l *$ SLA($S_i$) $\leq$ (MAXXID(DST($S_i$)) + CRITICALTIMEPATH($S_i, x$ − xid(DST($S_i$))))) − $x <$ SLA($S_i$), where $l \approx 0.8$ is suitable to account for run-time deviations such as a small delay that may arise if the PUSH is queued waiting for the capacity on a machine to be available. An appropriate value of $x$ is obtained by performing a binary search between xid(DST($S_i$)) and MINXID(SRC($S_i$)) that satisfies the above constraint.

The above algorithm works well for purely append workloads (i.e., only tuple inserts), but needs to be tweaked a bit to handle update workloads (i.e., containing both inserts and deletes). In particular, when dealing with update workloads advancing a delta relation $\Delta R$ directly from xid $x_1$ to xid $x_2$ would mean that $\Delta R$ will not be able to produce an intermediate snapshot, e.g., $\Delta R(x_1, x_3)$ such that $x_1 < x_3 < x_2$. To remedy this problem, we introduce the notion of a *stride* which is the maximum value by which the xid of a delta relation would be allowed to advance. Revisiting the lazy sharing executor algorithm, when we apply a binary search to find an appropriate value $x$ to advance DST($S_i$), we restrict $x$ to be a multiple of *stride*. Next, the push operators for Join and Union edge types are reimplemented so that they would advance the xid in increments of *stride* towards $x$ starting with the first multiple of *stride* greater than MINXID($SO(S_i)$). This small modification will ensure correctness of our lazy sharing executor when dealing with update workloads.

7. EXPERIMENTS

Our primary experimental setup is a sharing ecosystem constructed around Twitter dataset. We collected tweets from a *gardenhose* stream, which is a 10% sampling of all the tweets in Twitter, for a six month period starting from September 2010. The tweets obtained were unpacked into nine base relations corresponding to the information about the user (i.e., users relation), tweets (i.e., tweets relation), social network (socnet relation), and entities (i.e., urls, hashtags, foursq, curloc, photos relations) associated with the tweets and the location of the user (i.e., loc relation). The sharing arrangements were specified as different combinations of these base relations. A description of the base relations and the 25 sharing arrangements used in the evaluation are shown in Table 1. For each of the 25 sharing arrangements, we also mention an existing application that might possibly benefit from it.

Before proceeding with the experimental setup, we have to determine the sizes of the base relations at the start of the experiments. Although we can control the rate of ingestion of tweets into our system, the rate of update on the base relations (other than tweets) depends on the number of tweets seen so far by the system. For instance, at the beginning any incoming tweet most likely will contain the identity of a user not previously seen by the system, which would result in the insertion of a tuple to the users relation. However, after the system has ingested a sufficient number of tweets, the update rate on the users relation will decrease as some of the users already would be present in the users relation. The dependence between the number of tweets ingested by the system and the *chance* that an incoming tweet will result in an insertion to a base relation is expressed in terms of an *update ratio*. The update ratio is shown as a function of the number of tweets inserted in to the system for a few base relations in Table 1. For instance, after 7 million tweets have been ingested by our system, the update ratio of encountering a previously unseen user in the next tweet is around 0.3. Note that we did not show the update ratio curves for foursq, photos, and hashtags relations as they all resemble the curve for the urls relations in the sense that the chance that a tweet will contain a photo link or a foursq checkin is independent of the number of tweets seen by the system. Note that the update ratio for the tweets relation is always 1.0 as every tweet is inserted into the tweets relation. Our system starts with 7 million tweets prepopulated into our databases. As we vary the rate of arrival of tweets into our system, the rate of updates on the base relations can be estimated using their update ratio values.

Snapshot: To determine the efficacy of our system, an independent

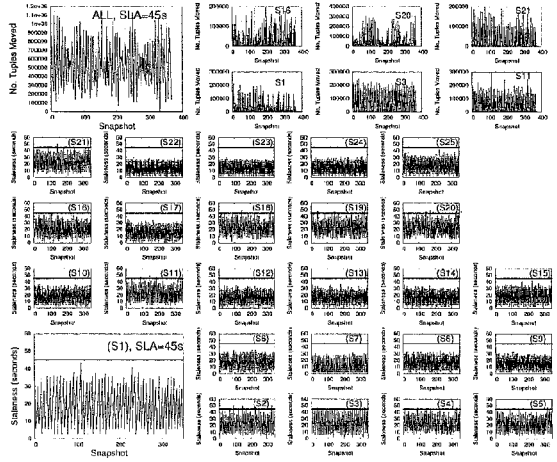

Figure 10: Staleness of twenty-five sharing arrangements across snapshots for a rate of 6k tweets/second (bottom) and the number of tuples moved in each snapshot (top).

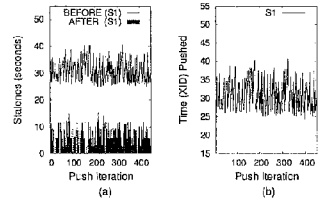

Figure 11: a) Staleness before and after a PUSH on $S_1$, while b) shows how much is pushed auditing module in our sharing executor, called *snapshot*, records the staleness of all the sharing arrangements once every 5 seconds. Suppose that a sharing arrangement $S_j$ was found to have a staleness less than the SLA at snapshot $i$. The assumption here is that if $S_j$ satisfied the SLA in snapshot $i + 1$, then the system is assumed to have maintained $S_j$ at the appropriate level of staleness for all intermediate time periods between $i$ and $i + 1$. The converse is assumed if $S_j$ is found to have violated the SLA at snapshot $i + 1$. The snapshot module also keeps track of the cost, number of tuples moved between snapshots. In addition to the snapshot module, we also measure statistics such as the staleness of all sharing arrangements before and after a PUSH operation as well as the cost incurred and time taken for each PUSH operation.

Setup: Our setup consisted of 6 machines such that one of the machines hosted all the 9 base relations, while the remaining 25 sharing arrangements were arbitrarily assigned to the remaining 5 machines, such that all the 5 machines were available to host the vertices and edges of the 25 sharing arrangements. We only considered a purely append workload on the base relations. That is, an incoming tweet can only add tuples to the base relations but never deletes tuples from any of the base relations. All the machines in our setup ran identical versions of Postgresql 9.1 database. The cost model was obtained from Amazon EC2 pricing available at http://aws.amazon.com/ec2/pricing/. Our machines were assumed to be equivalent to large Linux instances, which costs $0.34/hour. For the network cost, we assumed that the instances were in different *availability zone* but in the same *region*, which had a transfer cost of $0.01 per GB. For storage, we used EBS storage at $0.11 GB/month. Note that EBS also charges $0.11 per million I/O requests, which we disregarded for our experiments. The capacity of a machine was set at 30k tuples/second, which we obtained from Figure 16b.

Rate: We used 6 machines and 25 sharing arrangements as shown in Table 1 with a SLA of 45 seconds, while varying the rate of tweets from 50 to 6k tweets/second. We also replayed gardenhose stream, which roughly corresponds to an average of 100 tweets/second. The rate of arrival for tweets for a two hour window is shown in Figure 12c. As the gardenhose is obtained by sampling 1 out of 10 tweets from the *firehose*, which is a stream containing all the tweets in Twitter, we recreated a stream similar (although by no means equivalent) to firehose by replaying gardenhose at 10x speed. Note that we tested our system for rates up to 6k tweets/second (i.e., 3.6 billion tweets/week), which is about 4 times the average expected rate of the firehose stream used in the evaluation. Figure 10 (bottom) shows the staleness of the system across different snapshots. It can be seen that the staleness of each of the sharing arrangements increases until it comes close to the SLA (i.e., 45 seconds), after which the staleness sharply reduces to a low value due to a PUSH from the sharing executor. The staleness before and after a push operation is shown in Figure 11a, where it can be seen that the PUSH operation reduces the staleness of $S1$ to less than 10 seconds, just before the staleness of $S1$ was about to exceed the SLA. Figure 11b shows that every push operation advanced the xid of $S1$ by 25 to 40 seconds, which shows the *lazy* behavior of the sharing executor. One thing to note here is that there were only 31 violations for all the 25 sharings for the entire duration of the experiment lasting about 30 minutes. We summarize some of our observations below.

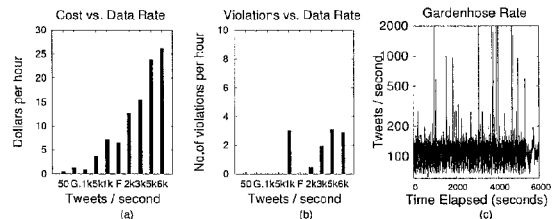

Figure 12: (a) Cost, and (b) violations per sharing-hour in varying rate from 50 to 6k, as well as for gardenhose (G), and firehose (F) streams. Gardenhose (G) rate is shown in (c)

The number of violations with varying incoming rate of tweets as well as the cost to maintain the sharing arrangements in sharing-hour are shown in Figures 12a–b. First of all, there were zero violations for the firehose (F) and gardenhose (G) streams, and about 3 violations per sharing-hour (i.e., per hour per sharings) for 6k tweets per second. At 6k tweets per second, the cost was about $25 per sharing-hour, although note that some of the sharing arrangements were much more expensive than the others. In contrast, the average cost for the firehose (F) stream was about $6 per sharing-hour. Note that the zero violations for both the gardenhose and firehose streams were in spite of their unpredictable arrival rate, which is shown in Figure 12c. Secondly, the number of tuples moved per snapshot (i.e., 5 seconds) across all the sharing arrangements was between 600k and 1.1 million tuples as shown in Figure 10 (top). The figure also shows some of the individual sharing arrangements that required the movement of a large number of tuples.

Next, notice in Figure 10 (bottom) that some sharing arrangements, such as S7, S8, S9, S10, and S23 have a larger *gap* between the peak staleness value and the SLA, whereas others such as S1, S3, S4, and S20 have a relatively smaller gaps. The reason for this is that those sharing arrangements with large gaps benefit from the commonality with other sharing arrangements but not so for those with smaller gaps. To test this hypothesis, we compared the number of tuples moved for each sharing arrangement in the above experimental setup with the number of tuples moved when the sharing arrangements are run in isolation. The number of tuples moved in the

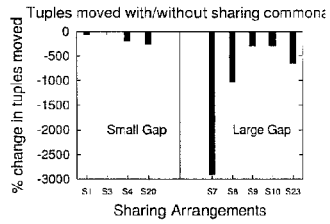

Figure 13: Number of tuples moved in the setup in Figure 10 expressed as percent reduction from the case when individual sharing arrangements are run in isolation former case is shown as a percentage reduction from the latter case in Figure 13. It can be seen that sharing arrangements with small gaps only benefit modestly from the presence of other sharing arrangements, whereas those with larger gaps benefit immensely from the presence of other sharing arrangements.

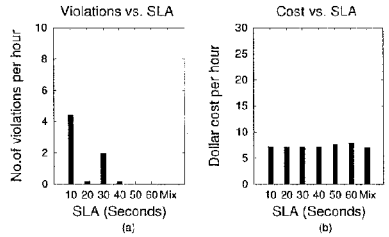

Figure 14: (a) Violations, and (b) costs in sharing-hour for varying SLA between 10 and 60 seconds

SLA: Our setup consisted of 6 machines, 25 sharing arrangements and an incoming rate of 1000 tweets/second and we varied the SLA between 10 and 60 seconds. Figure 14a shows the effect of varying the SLA in terms of the number of violations and the cost of maintaining the sharing arrangements. The number of violations is maximum for SLA = 10 seconds at 4 violations per sharing-hour, whereas the cost (shown in Figure 14b) of these sharing arrangements is unchanged for varying SLA as the network cost is the most dominating portion of the total cost. The intuition here is that regardless of the SLA the total number of tuples moved is the same (albeit different SLA had different network bandwidth requirements), which is why the costs for all the cases were the same. We will examine in a future study how bandwidth pricing will affect the cost for varying SLA.

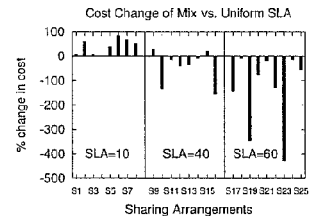

**Figure 15: Cost change for *mix* SLA compared to uniform SLA**

In the above experimental setup, we also examined a case where we assigned non-uniform SLA (see *mix* in Figures 14a–b) to the 25 sharing arrangements. In particular, S1–S7 were assigned a SLA of 10 seconds, S8–S15 a SLA of 40 seconds, and S16–S25 a SLA of 60 seconds. From Figures 14a–b, we can see that the *mix* case resulted in zero violations, although having comparable dollar costs to the uniform SLA cases. Then in Figure 15 we expressed the cost of an individual sharing arrangement in the mix case as a percentage change to the corresponding cost from the uniform case (i.e., compare costs of S1 from mix with uniform when SLA was 10 seconds). It is interesting to note that although the costs of S1–S7 have become marginally more expensive, the cost of the other sharing arrangements (i.e., S8–S15, S16–S25) is now significantly cheaper. This leads us to the conclusion that in a sharing ecosystem, a few sharing arrangements with small SLAs subsidize the operating cost of other (related) sharing arrangements.

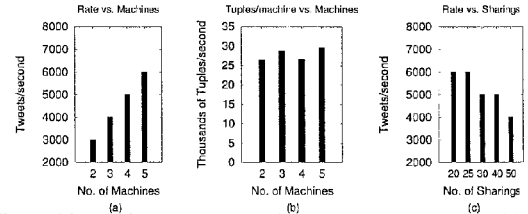

Figure 16: Maximum tweet rate for varying (a) machines, (b) sharings on a setup with SLA = 45

Machines and Sharings: In this experimental setup, we varied the machines from 2 to 5, while keeping the number of sharing arrangements fixed at 25 and a SLA of 45 seconds. For every setup, the capacity of the machine was determined to be the highest rate of tweets that the set of machines can support without losing the *stability* of the system. We have built an appropriate mechanism to monitor the stability of our system, which is not discussed here due to lack of space. It can be seen from Figure 16a that increasing the number of machines increases the maximum rate that can be handled by our system. Moreover, adding an extra machine increases the processing capacity of our system by at least 25–30k tuples/sec as can be seen from Figure 16b. Next, we varied the number of sharing arrangements from 20 to 50 keeping the number of machines fixed at 6 and SLA of 45 seconds, as shown in Figure 16c. We increased the number of sharing arrangements beyond 25 by placing the same sharing arrangement on more than one machine. With increasing number of sharing arrangements, the maximum rate decreases as database and other system bottlenecks start manifesting due to the increased number of vertices and edges that the system has to manage.

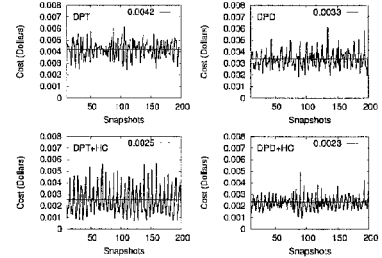

Figure 17: Cost of running DPT and DPD reduced by applying hill climbing algorithm to produce DPT+HC and DPD+HC

Algorithms: Next, we examined the efficacy of the hill climbing algorithm that we apply to the DPD and DPT algorithms to reduce the cost for the provider. For this experimental setup, we used 6 machines, 25 sharing arrangements and a rate of 2000 tweet/second. The cost model we considered was same as before, except that we changed the networking pricing to be within the same availability region in EC2 (i.e., no cost). We generated DPD and DPT sharing plans for this setup, and then applied the hill climbing algorithm to both these sharing plans to produce DPD+HC, and DPT+HC, respectively. The average cost in dollars per sharing-second for the four sharing plans in sharing-hour were as follows — DPT 0.0042, DPD 0.0033, DPT+HC 0.0025, and DPD+HC 0.0023 as shown in Figure 17. It can be noticed that DPD+HC has the cheapest cost but is comparable to DPT+HC. When we compared DPD with DPD+HC, and DPT with DPT+HC, the difference is quite significant representing a 35% reduction in cost, thus making a case for our hill climbing approach. Figure 18 shows the number of vertices and edges as the hill climbing algorithm takes DPD or DPT sharing plan as input and performs plumbing operations on it in a sequential fashion. As can be seen from the figure, the sharing plan is reduced by more than 80 vertices and edges for both DPD and DPT, which represents significant savings in terms of cost.

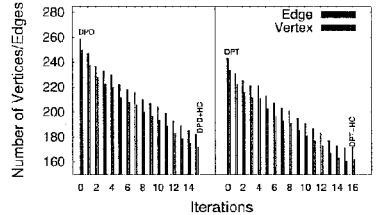

Figure 18: Reduction in vertices and edges as plumbing operations are sequentially applied to DPD and DPT Model Validation: Finally, in this set of experiments we evaluated our sharing executor using a *synthetic* load generator (details not given here), which given a set of sharing arrangements and selectivities between source relations produces updates at the desired rate, while maintaining selectivities. Note that one source of error in this setup is that the sharing executor still gathers statistics using the *heartbeat* mechanism, which may be *stale* as they are sent periodically. We used a setup with 26 base relations of size up to 700k tuples, 19 sharing arrangements, 6 machines, non-uniform SLA between 5 and 30 seconds. The results of the experiments are given in Figures 19a-c, where Figure 19a shows that our time model developed earlier makes an error of 10-20% in estimating the time taken for the Join, CopyDelta, and DeltaToRel edges, and up to 40% error for the Union edge. The errors involved in estimating the dollar cost and the number of tuples, given in Figures 19b-c, are less than 5%. Even for cases where the statistics are not precisely known, such as gardenhose and firehose streams, the system can still maintain these sharing arrangements with very low violations by just using the average rate of arrival as was shown in Figure 12.

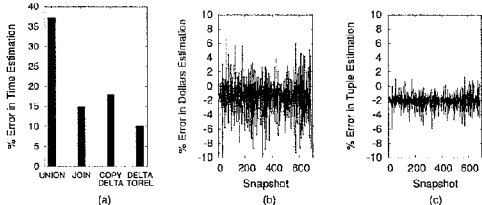

Figure 19: Percentage error for a synthetic setup in estimating a) time, b) cost and c) tuple

8. CONCLUDING REMARKS

In this paper we presented a system that can maintain several sharing arrangements in a multitenant cloud database at the appropriate level of staleness. Experimental results showed the effectiveness of our system in maintaining several sharing arrangements with low violations even under an update rate far exceeding firehose. We will examine the following possible extensions in a future work. Extending the SPJ transformation to support aggregate operators or adding simple data integration support by the way of non-relational operators requires developing additional edge types. Adding or removing sharing arrangements on the fly as the system is running requires the design of online algorithms as well as changes to the system to support such dynamism at run-time. We only considered two kinds of plumbings in this paper, but strategies from [15] can be cast as plumbing operations in our framework. We did not consider the price of data in this paper but a data market similar to the one proposed in [4] could be incorporated in our sharing framework.

9. REFERENCES

[1] D. Agrawal, A. E. Abbadi, A. Singh, and T. Yurek. Efficient view maintenance at data warehouses. In *SIGMOD*, pp. 417–427, Tucson, AZ, 1997.

[2] S. Agrawal, S. Chaudhuri, and V. R. Narasayya. Automated selection of materialized views and indexes in SQL databases. In *VLDB*, pp. 496–505, Cairo, Egypt, 2000.

[3] S. Aulbach, M. Seibold, D. Jacobs, and A. Kemper. Extensibility and data sharing in evolving multi-tenant databases. In *ICDE*, pp. 99–110, Hannover, Germany, 2011.

[4] M. Balazinska, B. Howe, and D. Suciu. Data markets in the cloud: An opportunity for the database community. In *VLDB*, volume 4(12), pp. 1482–1485, Seattle, WA, 2011.

[5] J. A. Blakeley, P.-A. Larson, and F. W. Tompa. Efficiently updating materialized views. In *SIGMOD*, pp. 61–71, Washington, DC, 1986.

[6] S. Chaudhuri. An overview of query optimization in relational systems. In *PODS*, pp. 34–43, Seattle, WA, 1998.

[7] C. Chekuri and S. Khanna. A PTAS for the multiple knapsack problem. In *SODA*, pp. 213–222, San Francisco, CA, 2000.

[8] M. N. Garofalakis and Y. E. Ioannidis. Parallel query scheduling and optimization with time- and space-shared resources. In *VLDB*, pp. 296–305, Athens, Greece, 1997.

[9] R. Geambasu, S. D. Gribble, and H. Levy. Cloudviews: communal data sharing in public clouds. In *HotCloud*, San Diego, CA, 2009. article 14.

[10] D. Kossmann, M. J. Franklin, and G. Drasch. Cache investment: integrating query optimization and distributed data placement. *TODS*, 25:517–558, 2000.

[11] S. Krishnamurthy, M. J. Franklin, J. M. Hellerstein, and G. Jacobson. The case for precision sharing. In *VLDB*, pp. 972–984, Toronto, Canada, 2004.

[12] A. Labrinidis and N. Roussopoulos. Reduction of materialized view staleness using online updates. Technical Report CS-TR-3878, UMD CS, 1998.

[13] G. M. Lohman, C. Mohan, L. M. Haas, D. Daniels, B. G. Lindsay, P. G. Selinger, and P. F. Wilms. Query processing in R*. In *Query Processing in Database Systems*, pp. 31–47. Springer, 1985.

[14] H. Mistry, P. Roy, S. Sudarshan, and K. Ramamritham. Materialized view selection and maintenance using multi-query optimization. In *SIGMOD*, pp. 307–318, Santa Barbara, CA, 2001.

[15] K. A. Ross, D. Srivastava, and S. Sudarshan. Materialized view maintenance and integrity constraint checking: Trading space for time. In *SIGMOD*, pp. 447–458, Montreal, Quebec, Canada, 1996.

[16] K. Salem, K. Beyer, B. Lindsay, and R. Cochrane. How to roll a join: Asynchronous incremental view maintenance. In *SIGMOD*, pp. 129–140, Dallas, TX, 2000.

[17] T.J.Green, G. Karvounarakis, N. E. Taylor, O. Biton, Z. G. Ives, and V. Tannen. Orchestra: facilitating collaborative data sharing. In *SIGMOD*, pp. 1131–1133, Beijing, China, 2007.

[18] Y. Zhuge, H. García-Molina, J. Hammer, and J. Widom. View maintenance in a warehousing environment. In *SIGMOD*, pp. 316–327, San Jose, CA, 1995.

[19] Y. Zhuge, H. García-Molina, and J. Wiener. The strobe algorithms for multi-source warehouse consistency. In *PDIS*, pp. 146–157, Miami Beach, FL, 1997.

What is claimed is:

1. A method for data sharing, comprising:
generating by a processor at least one sharing plan with a cheapest cost and/or a shortest execution time for one or more sharing arrangements with data sources that provide shared data on a cloud, and consumers who pay for the data;
determining admissibility of the one or more sharing arrangements by the processor, such that a critical time path of the at least one sharing plan does not exceed a staleness level and a cost of the at least one sharing plan does not exceed a capacity, wherein the sharing plan is inadmissible if its critical time path is greater than a staleness level specified in service level agreements (SLAs) or if the sharing plan exceeds machine capacity;
merging sharing plans associated with the sharing arrangements and discarding duplicate edges and vertices; and
executing sharing plans of admissible sharing arrangements while maintaining the staleness level;
determining, by the processor, one or more sharing plans that minimize cost while satisfying the SLAs based on a join cost determined as a cheapest cost of creating a join sequence R on machine m by joining with a sequence R−a on machine i ($m_i$) as follows:

$$JOINCOST(R, m_i, CAP^{<R,m_i>}, D^{<R,m_i>}) =$$

$$\min_{\forall m_j, m_k} JOINCOST(R-a, m_j, CAP^{<R,-a,m_j>}, D^{<R,-a,m_j>}) +$$

$$\begin{cases} (a) & \{INPLACEJOINCOST(R-a, m_j, a, m_k, m_i, \\ & CAP^{<R-a,m_j>}, D^{<R-a,m_j>}) \\ (b) & \begin{cases} COPYRELATIONCOST(R-a, m_j, m_k, CAP^{<R-a,m_j>}) + \\ INPLACEJOINCOST(R-a, m_k, a, m_k, m_i, \\ CAP^{<R-a,m_j>}, D^{<R-a,m_j>}) \end{cases} \\ (c) & \begin{cases} COPYRELATIONCOST(a, m_k, m_j, CAP^{<R-a,m_j>}) + \\ INPLACEJOINCOST(R-a, m_j, a, m_j, m_i, \\ CAP^{<R-a,m_i>}, D^{<R-a,m_j>}) \end{cases} \\ (d) & \begin{cases} COPYRELATIONCOST(a, m_k, m_i, CAP^{<R-a,m_j>}) + \\ COPYRELATIONCOST(a, m_j, m_i, CAP^{<R-a,m_j>}) + \\ INPLACEJOINCOST(R-a, m_i, a, m_i, m_i, \\ CAP^{<R-a,m_j>}, D^{<R-a,m_j>}) \end{cases} \end{cases}$$

where COPYRELATIONCOST function takes a sharing plan D and machine capacity $CAP^D$ and creates a copy of a vertex on another machine and updates D and $CAP^D$.

2. The method as recited in claim 1, wherein executing includes simultaneously executing two or more of the sharing plans of admissible sharing arrangements while maintaining the staleness level.

3. The method as recited in claim 1, wherein the critical time path includes a longest path of the at least one sharing plan based on time taken to push tuples from source to destination.

4. The method as recited in claim 1, wherein the shortest execution time is based upon the critical time.

5. The method as recited in claim 1, wherein the cost includes a cost to maintain the staleness level.

6. A computer implemented system for data sharing, comprising:
one or more processors;
a non-transitory computer-readable storage medium coupled to the processor, the medium storing a plurality of modules configured for execution by the one or more processors;
a generation module configured to generate at least one sharing plan with a cheapest cost and/or a shortest execution time for one or more sharing arrangements with data sources that provide shared data on a cloud, and consumers who pay for the data;
the generation module further configured to determine admissibility of the one or more sharing arrangements, using a processor, such that a critical time path of the at least one sharing plan does not exceed a staleness level and a cost of the at least one sharing plan does not exceed a capacity; and
a sharing executor module configured to execute sharing plans of admissible sharing arrangements while maintaining a staleness level specified in service level agreements (SLAs) with consumers and to determine one or more sharing plans that minimize cost while satisfying SLAs, wherein the sharing plan is inadmissible if its critical time path is greater than a staleness level specified in service level agreements (SLAs) or if the sharing plan exceeds machine capacity, the sharing executor module further configured to merge all sharing plans and discard duplicate edges and vertices based on a join cost determined as a cheapest cost of creating a join sequence R on machine m by joining with a sequence R−a on machine i ($m_i$) as follows:

$$JJOINCOST(R, m_i, CAP^{<R,m_i>}, D^{<R,m_i>}) =$$

$$\min_{\forall m_j, m_k} JOINCOST(R-a, m_j, CAP^{<R,-a,m_j>}, D^{<R,-a,m_j>}) +$$

$$\begin{cases} (a) & \{INPLACEJOINCOST(R-a, m_j, a, m_k, m_i, \\ & CAP^{<R-a,m_j>}, D^{<R-a,m_j>}) \\ (b) & \begin{cases} COPYRELATIONCOST(R-a, m_j, m_k, CAP^{<R-a,m_j>}) + \\ INPLACEJOINCOST(R-a, m_k, a, m_k, m_i, \\ CAP^{<R-a,m_j>}, D^{<R-a,m_j>}) \end{cases} \\ (c) & \begin{cases} COPYRELATIONCOST(a, m_k, m_j, CAP^{<R-a,m_j>}) + \\ INPLACEJOINCOST(R-a, m_j, a, m_j, m_i, \\ CAP^{<R-a,m_i>}, D^{<R-a,m_j>}) \end{cases} \\ (d) & \begin{cases} COPYRELATIONCOST(a, m_k, m_i, CAP^{<R-a,m_j>}) + \\ COPYRELATIONCOST(a, m_j, m_i, CAP^{<R-a,m_j>}) + \\ INPLACEJOINCOST(R-a, m_i, a, m_i, m_i, \\ CAP^{<R-a,m_j>}, D^{<R-a,m_j>}) \end{cases} \end{cases}$$

where COPYRELATIONCOST function takes a sharing plan D and machine capacity $CAP^D$ and creates a copy of a vertex on another machine and updates D and $CAP^D$.

7. The system as recited in claim 6, wherein the sharing executor is further configured to simultaneously execute two or more of the sharing plans of admissible sharing arrangements while maintaining the staleness level.

8. The system as recited in claim 6, wherein the critical time path includes a longest path of the at least one sharing plan based on time taken to push tuples from source to destination.

9. The system as recited in claim 6, wherein the shortest execution time is based upon the critical time.

10. The system as recited in claim 6, wherein the cost includes a cost to maintain the staleness level.

* * * * *